(12) United States Patent
Uchihara et al.

(10) Patent No.: US 12,483,779 B2
(45) Date of Patent: Nov. 25, 2025

(54) IMAGE PROCESSING DEVICE, SIMULATION DEVICE, AND STORAGE MEDIUM

(71) Applicant: CANON KABUSHIKI KAISHA, Tokyo (JP)

(72) Inventors: Masato Uchihara, Tokyo (JP); Yuji Omori, Kanagawa (JP); Toshihiro Mochizuki, Kanagawa (JP); Takayuki Hara, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 398 days.

(21) Appl. No.: 18/004,720

(22) PCT Filed: Jun. 3, 2021

(86) PCT No.: PCT/JP2021/021190
§ 371 (c)(1),
(2) Date: Jul. 12, 2023

(87) PCT Pub. No.: WO2022/014189
PCT Pub. Date: Jan. 20, 2022

(65) Prior Publication Data
US 2024/0292090 A1    Aug. 29, 2024

(30) Foreign Application Priority Data
Jul. 16, 2020 (JP) .................................. 2020-121819

(51) Int. Cl.
*G06T 19/00* (2011.01)
*G06T 17/00* (2006.01)
(Continued)

(52) U.S. Cl.
CPC .............. *H04N 23/64* (2023.01); *G06T 17/00* (2013.01); *G06T 19/006* (2013.01); *H04N 23/633* (2023.01); *G06T 2200/24* (2013.01)

(58) Field of Classification Search
CPC ...... H04N 23/64; H04N 23/633; H04N 23/60; G06T 17/00; G06T 19/006; G06T 2200/24
See application file for complete search history.

(56) References Cited

U.S. PATENT DOCUMENTS

| 8,743,185 B2 | 6/2014 | Yamaguchi et al. |
| 9,569,660 B2 | 2/2017 | Sako et al. |

(Continued)

FOREIGN PATENT DOCUMENTS

| JP | 2004-297191 A | 10/2004 |
| JP | 2009-124658 A | 6/2009 |

(Continued)

OTHER PUBLICATIONS

The Aug. 6, 2024 Japanese Office Action, without an English Translation, that issued in Japanese Patent Application No. 2020-121819.

(Continued)

*Primary Examiner* — Chong Wu
(74) *Attorney, Agent, or Firm* — Cowan, Liebowitz & Latman, P.C.

(57) ABSTRACT

An image processing device including at least one memory for storing commands and at least one processor for executing the commands by communicating with the at least one memory, in which the commands include inputting information on an event to be imaged and imaging information, constructing a virtual space assuming an event situation based on the event information, generating a simulation image based on the imaging information using the virtual space, evaluating the degree of similarity between the simulation image and a desired captured image, and giving a notification of imaging conditions according to the evaluated degree of similarity.

19 Claims, 35 Drawing Sheets

(51) Int. Cl.
    *H04N 23/60* (2023.01)
    *H04N 23/63* (2023.01)

(56) References Cited

U.S. PATENT DOCUMENTS

2020/0019156 A1\* 1/2020 Drew ...................... A47L 9/009
2021/0319880 A1\* 10/2021 Tomii ..................... G16H 50/70

FOREIGN PATENT DOCUMENTS

| | | |
|---|---|---|
| JP | 2012-113281 A | 6/2012 |
| JP | 2014-042190 A | 3/2014 |
| JP | 2016-213808 A | 12/2016 |
| JP | 2018194366 A | 12/2018 |
| WO | 2019065551 A | 4/2019 |

OTHER PUBLICATIONS

The above foreign patent documents 1-2 and 4-5 were cited the International Search Report of PCT/JP2021/021190 Jun. 3, 2021.
The above foreign patent documents were cited in the Feb. 4, 2025 Japanese Office Action, without an English Translation, that issued in Japanese Patent Application No. 2020-121819.

\* cited by examiner

SUBJECT POSITIONAL INFORMATION

| SUBJECT INFORMATION 1 | SUBJECT INFORMATION 2 | SUBJECT INFORMATION 3 | SUBJECT INFORMATION 4 |
|---|---|---|---|
| (T0, X0, Y0, D0) (T1, X1, Y1, D1) (T2, X2, Y2, Y2, D2) ⋮ (TN, XN, YN, DN) | (T0, X0, Y0, D0) (T1, X1, Y1, D1) (T2, X2, Y2, D2) ⋮ (TN, XN, YN, DN) | (T0, X0, Y0, D0) (T1, X1, Y1, D1) (T2, X2, Y2, D2) ⋮ (TN, XN, YN, DN) | (T0, X0, Y0, D0) (T1, X1, Y1, D1) (T2, X2, Y2, D2) ⋮ (TN, XN, YN, DN) |

Sample photo

Horizontal imaging
Number of subjects: 3
Position of face: ( 80, 240 ), ( 300, 220 ), ( 510, 230 )
Size of face: 60, 60, 60
Direction of face: facing to left, facing to left, facing to left Input information Sample photo vertical imaging 1
Number of subjects: 1
Position of face: ( 240, 160 )
Size of face: 110
Direction of face: facing slightly to right Input information

MODELING RESULTS
(TIME:T0, NEAR START LINE)

Wnum = 0.40
Wpos = 0.10
Wsize = 0.40
Wdir = 0.10

Wnum = 0.25
Wpos = 0.25
Wsize = 0.25
Wdir = 0.25

Wnum = 0.10
Wpos = 0.10
Wsize = 0.50
Wdir = 0.30

| Parameters of captured image | | | | Evaluation results (Degrees of similarity of students and score obtained by summing degrees of similarity) | | | | |
|---|---|---|---|---|---|---|---|---|
| Imaging position | Imaging direction | Imaging angle-of-view | Time | Student A | Student B | Student C | Student D | Score |
| P5 | D12 | F5 | T1 | 25 | 60 | 70 | 85 | 240 |
| P3 | D4 | F4 | T1 | 85 | 70 | 65 | 15 | 235 |
| P7 | D0 | F5 | T1 | 60 | 80 | 20 | 70 | 230 |
| P1 | D8 | F5 | T1 | 50 | 15 | 75 | 55 | 195 |

FIG. 41

| Camera position | Time | Main subject |
|---|---|---|
| P5 | T0 | 1014 student D |
| | T1 | 1014 student D |
| | T1+(T2−T1)/2 | 1013 student C |
| | T2 | 1013 student C |

IMAGE PROCESSING DEVICE, SIMULATION DEVICE, AND STORAGE MEDIUM

BACKGROUND OF THE INVENTION

Field of the Invention

The present invention relates to an image processing device using a virtual space, a simulation device, and a storage medium.

Description of the Related Art

In order to efficiently image events such as a sports day or a wedding, location hunting (hereafter referred to as location hunting) in which imaging conditions, such as an imaging position and an angle of view, for visiting a venue in advance and obtaining desired captured images are examined is effective.

Location hunting is work that makes it possible to smoothly perform imaging on the day of an event by bringing a plurality of pieces of imaging equipment to an event venue in advance and repeatedly performing trial imaging.

On the other hand, simulation technology for reproducing spaces such as an event venue by using three-dimensional measurement data has become widespread. For Example, Japanese Patent Application Laid-Open No. 2012-113281 discloses simulation technology for generating image data of the inside of an event venue viewed from any position and any direction by using an image of the event venue imaged at a plurality of viewpoints. In addition, a simulation service that makes it possible to confirm an event venue from any position and any direction has appeared.

However, in simulation using the above-described arbitrary-viewpoint image synthesis technology, even when the state of a venue can be confirmed, it is difficult to examine a captured image taking the position and size of a person who is actually a subject into consideration.

Further, in order to find imaging conditions such as an imaging position, direction, and angle of view for obtaining desired captured images, it is necessary to search around a simulation screen by using an input operation of a mouse, a keyboard, or the like, which results in a problem that it takes a long period of time.

An object of the present invention is to provide an image processing device and the like which are capable of rapidly acquiring appropriate imaging conditions by using a virtual space.

SUMMARY OF THE INVENTION

To solve the above problems, one aspect of the present invention is an image processing device including at least one memory for storing commands and at least one processor for executing the commands by communicating with the at least one memory, in which the commands include inputting information on an event to be imaged and imaging information, constructing a virtual space assuming an event situation based on the event information, generating a simulation image based on the imaging information using the virtual space, evaluating the degree of similarity between the simulation image and a desired captured image, and giving a notification of imaging conditions according to the evaluated degree of similarity.

Further features of the present invention will become apparent from the following description of Embodiments with reference to the attached drawings.

BRIEF DESCRIPTION OF THE DRAWINGS

FIG. 36 is a conceptual diagram in which imaging information and similarities of students are associated with each other in Embodiment 4.

FIG. 41 is a conceptual diagram of a fixed-point camera in Embodiment 5 and a subject to be followed.

DESCRIPTION OF THE EMBODIMENTS

Figure 1:
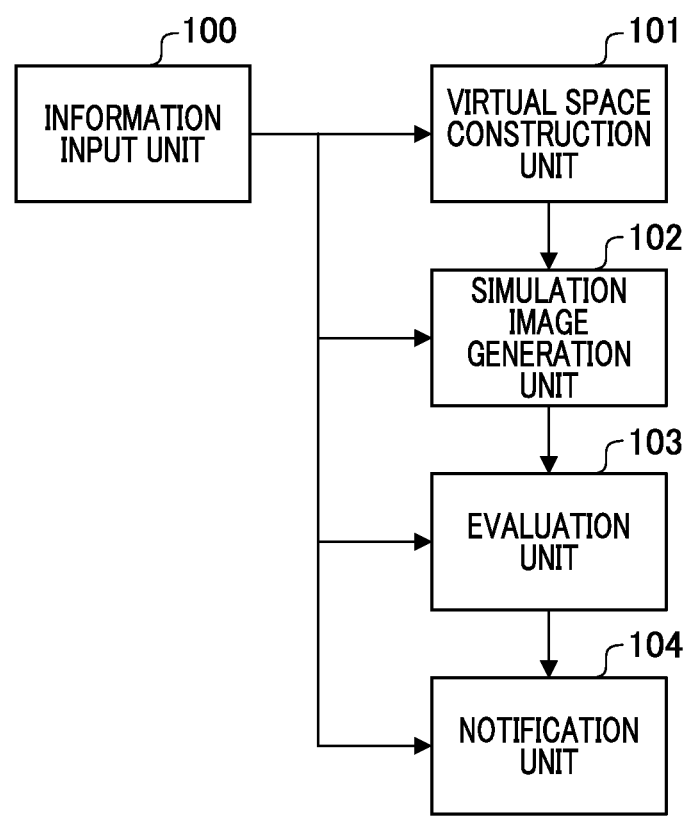
FIG. 1 is a block diagram illustrating a configuration example of a simulation device according to Embodiment 1.

Preferred Embodiments of the present invention will now be described with reference to the accompanying drawings. In the drawings, the same members or elements are denoted by the same reference numerals and signs, and repeated description is omitted or simplified.

Embodiment 1

FIG. 1 is a block diagram illustrating a configuration example of a simulation device as an image processing device according to Embodiment 1. In the present Embodiment, a sports day at an elementary school is assumed as an event for convenience of description, but the same applies for other events.

In FIG. 1, the simulation device includes an information input unit 100 that inputs information of an event to be imaged, imaging information, a desired captured image, and the like.

In addition, the simulation device includes a virtual space construction unit 101 that constructs a virtual space in which an event situation is reproduced (assumed) using a subject model, based on the information input by the information input unit 100. In addition, the simulation device includes a simulation image generation unit 102 that generates an image captured in an event venue as a simulation image by using the virtual space.

Further, the simulation device includes an evaluation unit 103 that evaluates the degree of similarity between the simulation image and a desired captured image, and a notification unit 104 that collects imaging conditions corresponding to the degree of similarity to increase an evaluation result of the evaluation unit 103 and notifies a user of them.

Here, the functions of the virtual space construction unit 101, the simulation image generation unit 102, the evaluation unit 103, the notification unit 104, and the like are realized by causing a computer, which is not illustrated in the drawing, to execute a computer program. Note that, each of the functions may be constituted by a discrete circuit.

The information input unit 100 is a unit that inputs program information of an event to be imaged (event program information), imaging information, desired captured images, and the like. The event is an event held by a large number of people gathered together, such as a sports day, an athletic contest, a race, a play, a school arts festival, a festival, a live music event, or a wedding.

The event program information includes a layout of a venue where the event is held, the content of the event, the order of the event, subject positional information representing movement information of subjects participating in the event, and the like.

Figure 2:
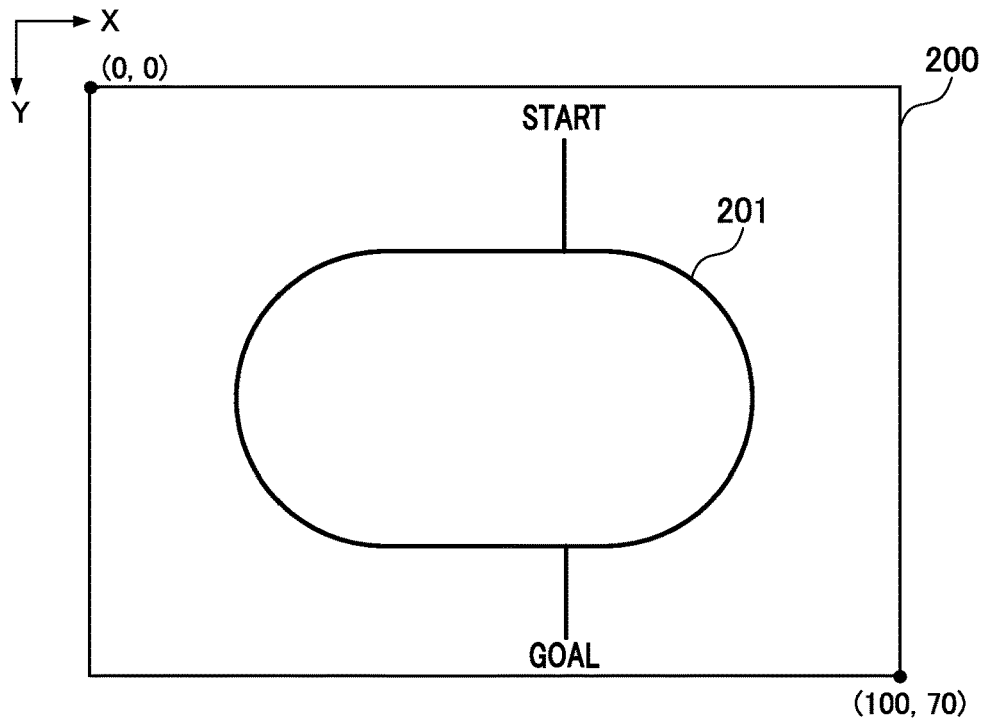
FIG. 2 is a diagram illustrating an example of a venue layout of a sports day in Embodiment 1.

The venue layout is a bird's-eye view of the venue where the event is held, or the like. FIG. 2 is a diagram illustrating an example of a venue layout in a sports day in Embodiment 1. Reference numeral 200 in FIG. 2 denotes an athletic field serving as an event venue and is represented by a two-dimensional (X, Y) coordinate space with an upper left side as the origin (0, 0). Reference numeral 201 in FIG. 2 denotes a track which is used as a running path or a boundary line in each competition of the sports day.

Figure 3:
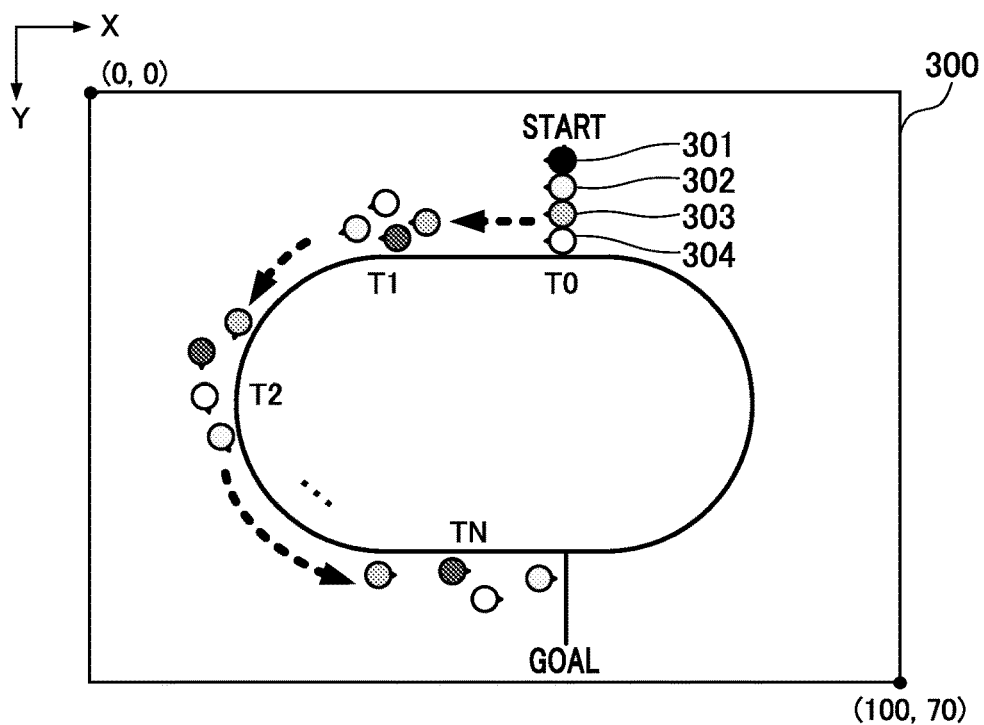
FIG. 3 is a diagram illustrating an example of subject positional information in a foot race in Embodiment 1.

FIG. 3 is a diagram illustrating an example of subject positional information in a foot race in Embodiment 1. The subject positional information is information on at least one of the position and direction of each of subjects (contestants and participants) at each time when the event is being held.

An outline of subject positional information will be described using a foot race at a sports day as an example with reference to FIG. 3. Reference numerals 301, 302, 303, and 304 in the drawing denote four students (subjects) who are participating in the competition, and FIG. 3 illustrates a state where the students are moving toward a goal from a start of a track drawn on an athletic field 300 as time elapses in order of T0, T1, and T2.

Figures 4, 5:
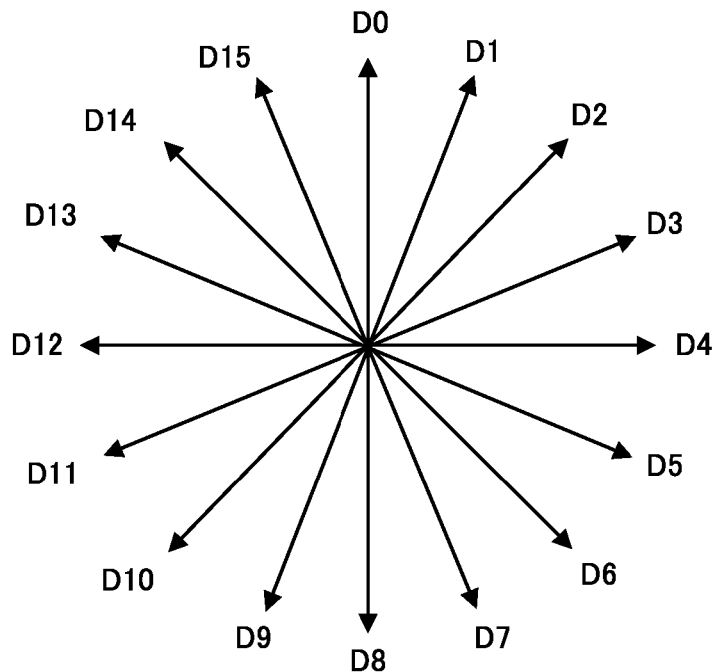
FIG. 4 is a diagram illustrating an example of a method of designating the direction of a subject in Embodiment 1.
FIG. 5 is a diagram illustrating an example of a format of subject positional information in Embodiment 1.

Here, the position of each student is represented by XY coordinates in the same manner as in the venue layout in FIG. 1. FIG. 4 is a diagram illustrating an example of a method of designating the direction of a subject in Embodiment 1, and the direction of the student is represented by directions of arrows (D0 to D15) obtained by equally dividing 360 degrees as illustrated in FIG. 4.

FIG. 5 is a diagram illustrating an example of a format of subject positional information in Embodiment 1, and the subject positional information which is input to the information input unit 100 is constituted by a combination (set) of a position and direction at each time for a plurality of subjects, as illustrated in FIG. 5.

The subject positional information can be preset and stored in the information input unit 100 for each event program (in the case of a sports day, for each competition such as a foot race or tug-of-war). Thereby, the user can select desired subject positional information from samples of the subject positional information preset in accordance with the event program.

The content and order of the held event are input as program information of the event, but a user interface thereof (hereafter abbreviated as "UI") will not be mentioned here. Data digitized in advance may be input, or may be input by the user using a graphical user interface (hereinafter abbreviated as a GUI).

Imaging information includes at least one of an imaging position, an imaging direction, and an imaging angle-of-view.

Figure 6:
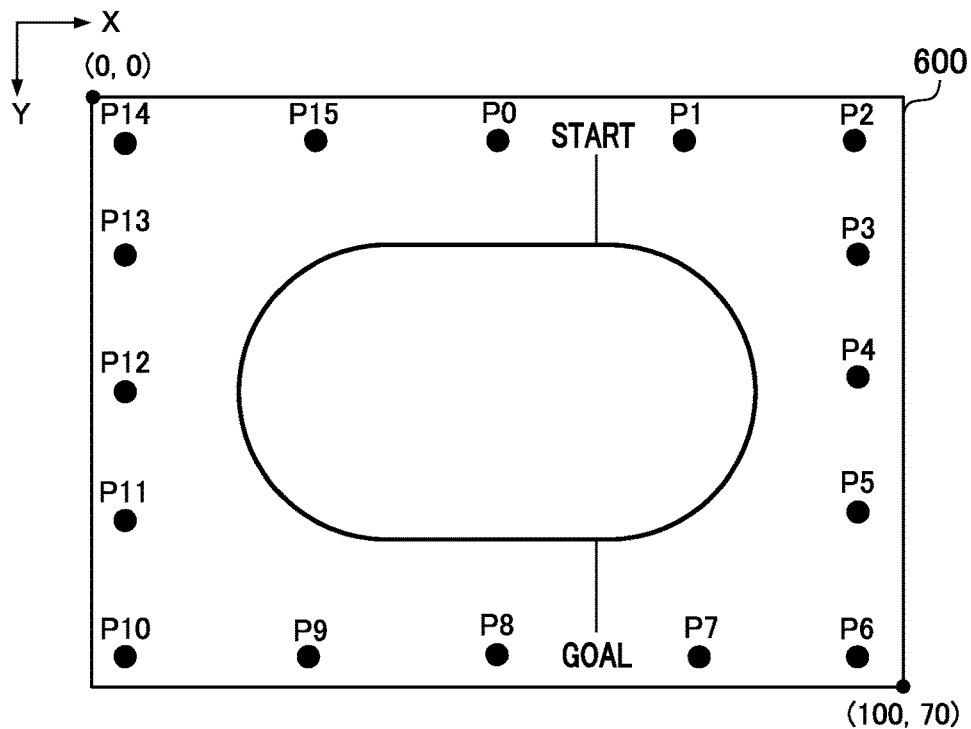
FIG. 6 is a diagram illustrating an example of imaging positional information in Embodiment 1.

FIG. 6 is a diagram illustrating an example of imaging positional information in Embodiment 1, and is information on a region that allows invasion (entrance) by a photographer or imaging equipment such as a drone in an event venue. In FIG. 6, P0 to P15 indicated by black circles around an athletic field 600 denote imaging positions. Each of the imaging positions is represented by XY coordinates as in the venue layout in FIG. 1.

The imaging direction is a direction (the direction of a camera) in which a photographer or imaging equipment such as a drone performs imaging, and is represented by the directions of arrows (D0 to D15) obtained by equally dividing 360 degrees as in FIG. 4.

Figure 7:
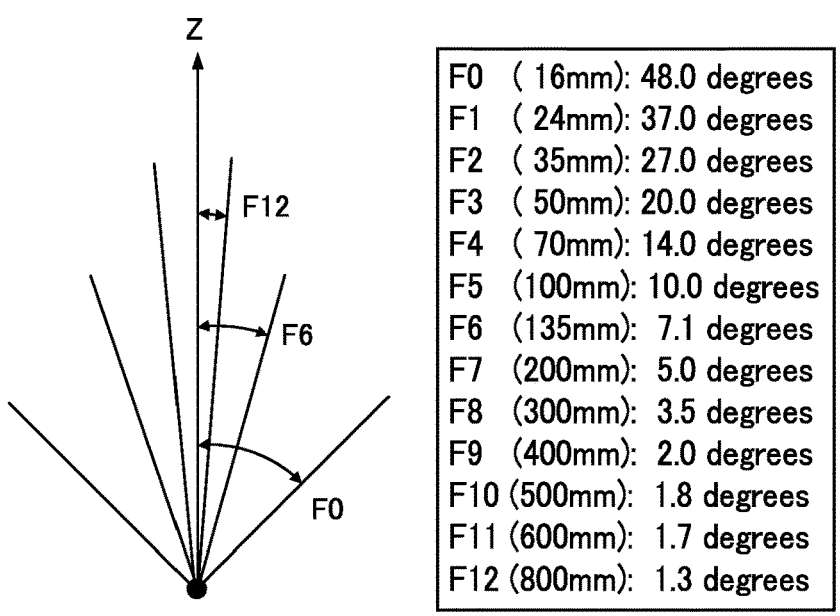
FIG. 7 is a diagram illustrating an example of imaging angle-of-view information in Embodiment 1.

FIG. 7 is a diagram illustrating an example of imaging angle-of-view information in Embodiment 1, and an imaging angle-of-view is angle-of-view information of a lens mounted on a camera that performs imaging.

As illustrated in FIG. 7, angles with respect to an optical axis Z are set for discrete lens focal lengths from a wide angle (F0: 16 mm) to a super-telephoto end (F12: 800 mm) when converted to a sensor size of 35 mm. Further, the imaging information also includes information of the camera used for imaging and the number of captured images.

Figure 8A:
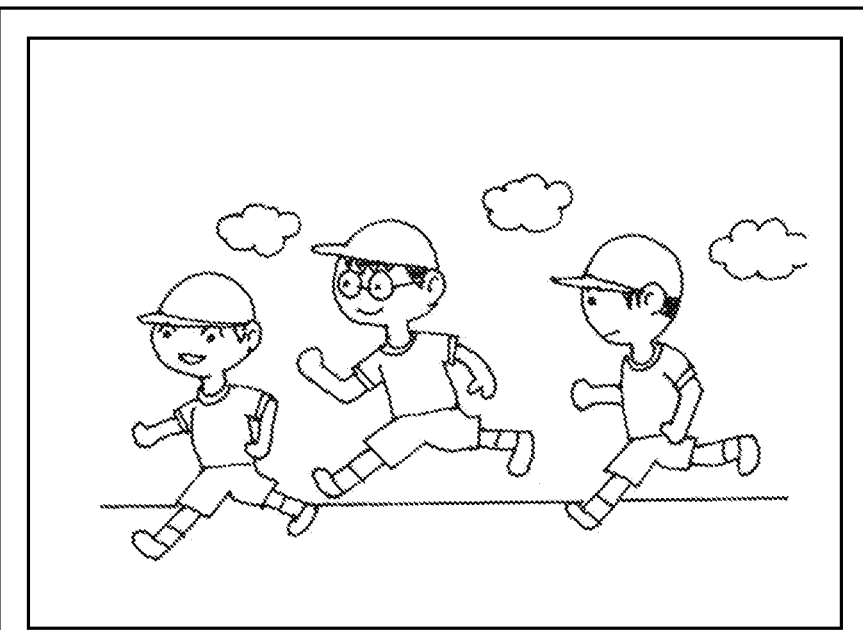
FIGS. 8A to 8C are diagrams illustrating examples of desired captured images in Embodiment 1.
Figure 8B:
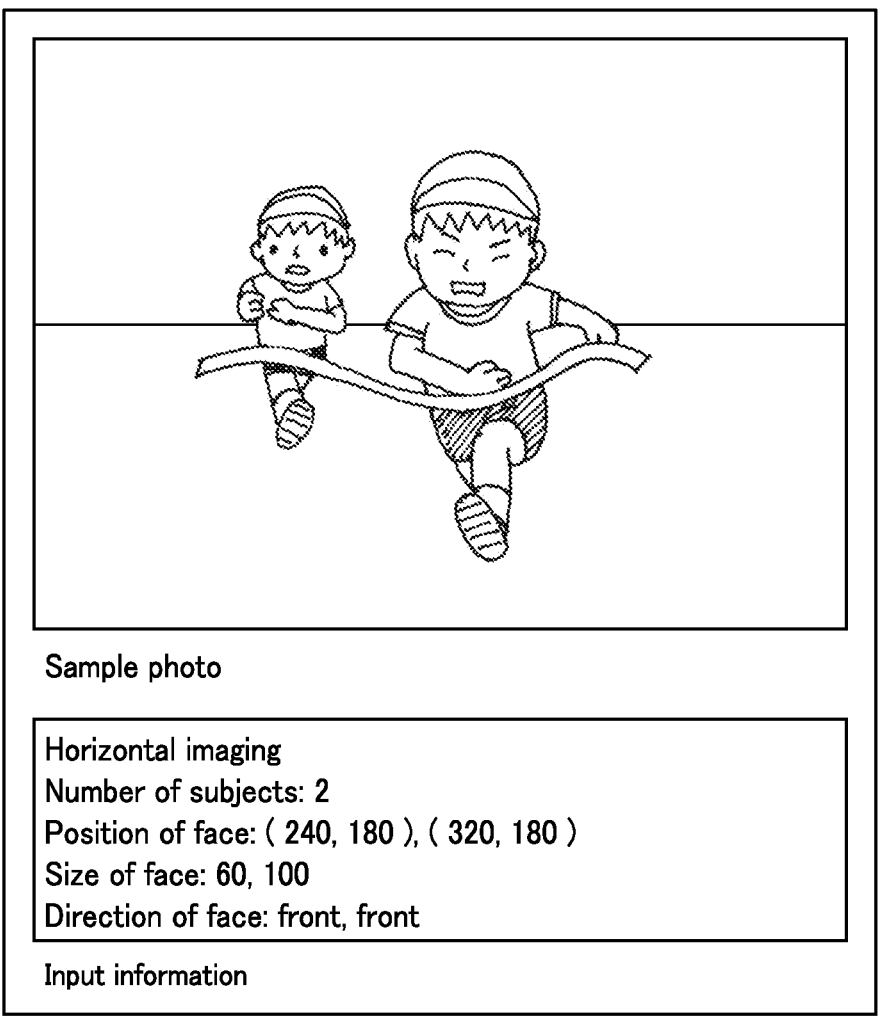
Figure 8C:

FIGS. 8A to 8C are diagrams illustrating examples of desired captured images in Embodiment 1, and the desired captured image is information including the number of subjects, the position of a face, the size of a face, and the direction of a face in an image desired to be captured by a user.

Various methods are conceivable as means for inputting a desired captured image, but captured images or illustrations of the same event held in the past are input as samples. In the present Embodiment, a large number of sample images such as those illustrated in FIGS. 8A, 8B, and 8C are prepared, and each of the sample images is stored in association with the number of subjects, the position of a face, the size of a face, and the direction of a face.

When the user selects a desired captured image from among the sample images, at least one of the number of subjects, the position of a face, the size of a face, and the direction of a face associated with the selected sample image is set and stored as input information. Regarding the desired captured image, a plurality of captured images can be selected.

The virtual space construction unit 101 generates a virtual space in which an event situation is reproduced by a model based on event information input to the information input unit 100.

Figure 9:
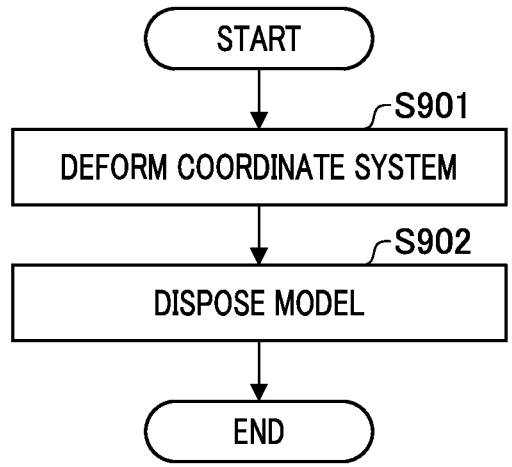
FIG. 9 is a flowchart of virtual space construction in Embodiment 1.

FIG. 9 is a flowchart of virtual space construction in Embodiment 1, which is realized by causing a computer, which is not illustrated in the drawing, to execute a computer program stored in the memory. A flow of the generation of the virtual space will be described with reference to FIG. 9.

Figure 10:
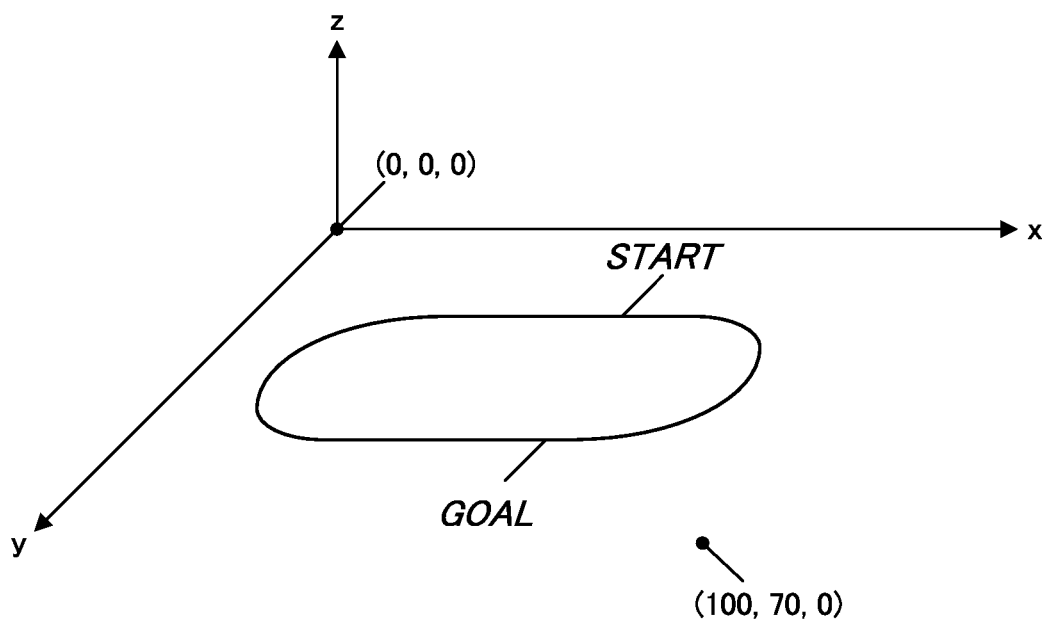
FIG. 10 is a diagram illustrating an example of coordinate transformation of a venue layout in Embodiment 1.

First, in step S901 of FIG. 9, the virtual space construction unit 101 converts a two-dimensional venue layout input to the information input unit 100 into a three-dimensional coordinate space (xyz coordinate system) as illustrated in FIG. 10. Here, FIG. 10 is a diagram illustrating an example of coordinate transformation of a venue layout in Embodiment 1.

Subsequently, in step S902, the virtual space construction unit 101 disposes a subject model in a three-dimensional coordinate space based on the subject positional information input to the information input unit 100.

Figure 11:
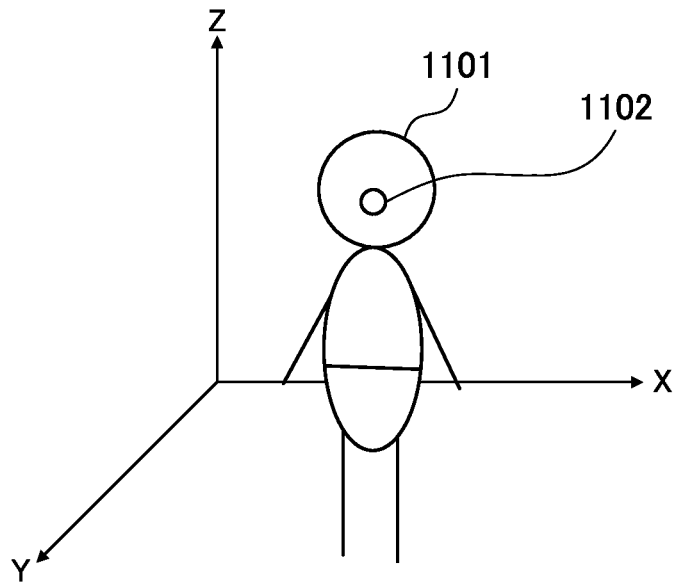
FIG. 11 is a diagram illustrating an image of a subject model in Embodiment 1.

FIG. 11 is a diagram illustrating an image of a subject model in Embodiment 1. Reference numeral 1101 denotes a model of a student who is a subject in a sports day, and is represented by, for example, a polygon in a three-dimensional coordinate space. Reference numeral 1102 in the drawing denotes a front mark that indicates the direction of the student's face. A plurality of subject models in FIG. 11 are disposed in a three-dimensional coordinate space based on subject positional information.

Figure 12:
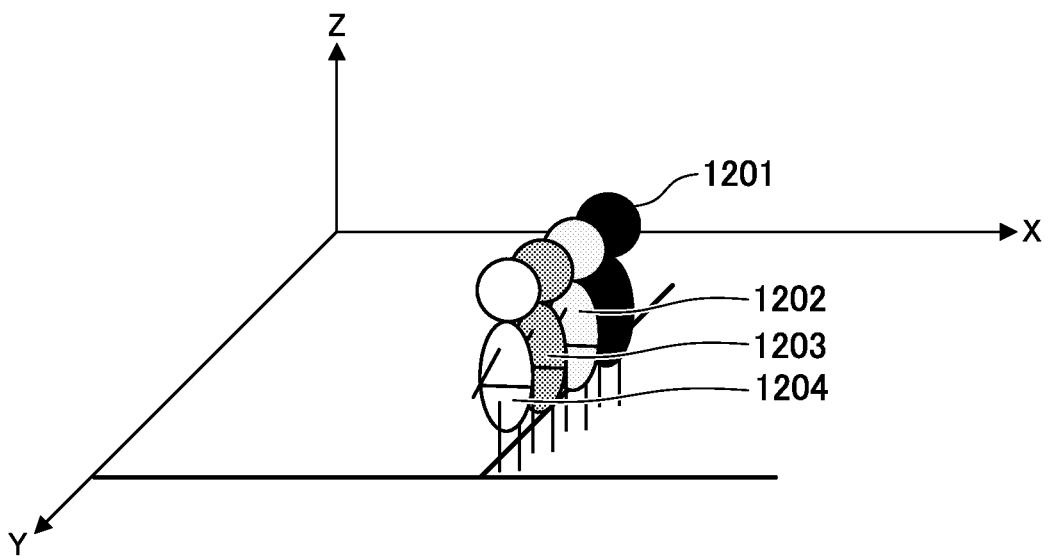
FIG. 12 is a diagram illustrating an example of a model arrangement in a virtual space in Embodiment 1.

FIG. 12 is a diagram illustrating an example of model arrangement in a virtual space in Embodiment 1. In FIG. 12, a virtual space near a start line at time T0 is displayed. The positions and directions of subject models 1201, 1202, 1203, and 1204 change with time based on subject positional information.

Further, the virtual space construction unit 101 images the current scenery and recognizes the spatial position and shape of the captured image.

Figure 13:
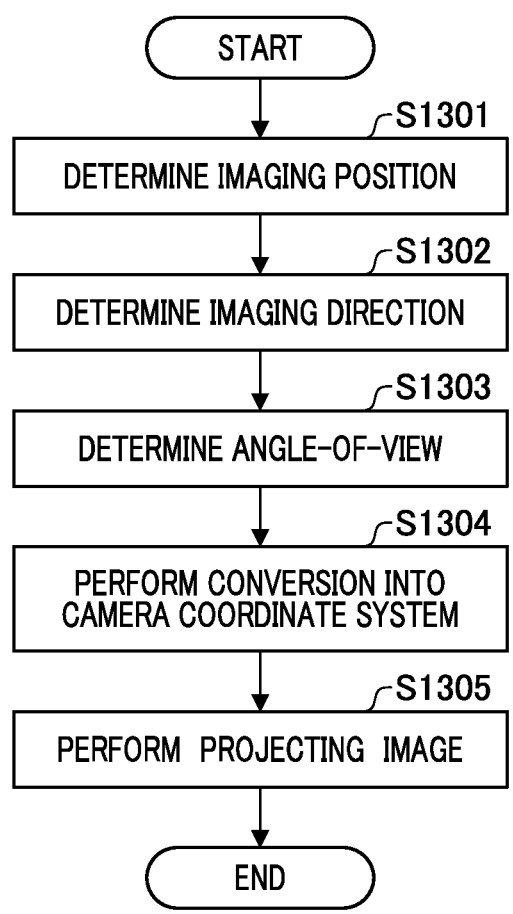
FIG. 13 is a flowchart of simulation image generation in Embodiment 1.

The simulation image generation unit 102 generates an image obtained when imaging is performed in an event venue as a simulation image by using the virtual space. FIG. 13 is a flowchart of simulation image generation in Embodiment 1, which is realized by causing a computer, which is not illustrated in the drawing, to execute a computer program stored in the memory. A flow of simulation image generation will be described using the flowchart of FIG. 13.

In step S1301, a position for performing imaging in a three-dimensional coordinate space in which a subject model is disposed is determined. An imaging position is input to the information input unit 100 and selected from among the imaging positions P0 to P15 in FIG. 6.

Subsequently, in step S1302, the direction of a camera that performs imaging within a three-dimensional coordinate space is set. The direction of the camera is input to the information input unit 100 and selected from among the imaging directions D0 to D15 in FIG. 4.

Subsequently, in step S1303, the angle of view of the camera that performs imaging in a three-dimensional coordinate space is set. The angle of view is input to the information input unit 100 and selected from among the imaging angles-of-view F0 to F12 in FIG. 7

Subsequently, in step S1304, a camera coordinate system (XYZ coordinate system) is set with the imaging position (xc, yc, zc) set in step S1301 as the origin and the imaging direction set in step S1302 as the Z axis. Then, the coordinate position in the xyz coordinate system of the subject model is converted into a camera coordinate system (XYZ coordinate system) as illustrated in FIG. 14.

Figure 14:
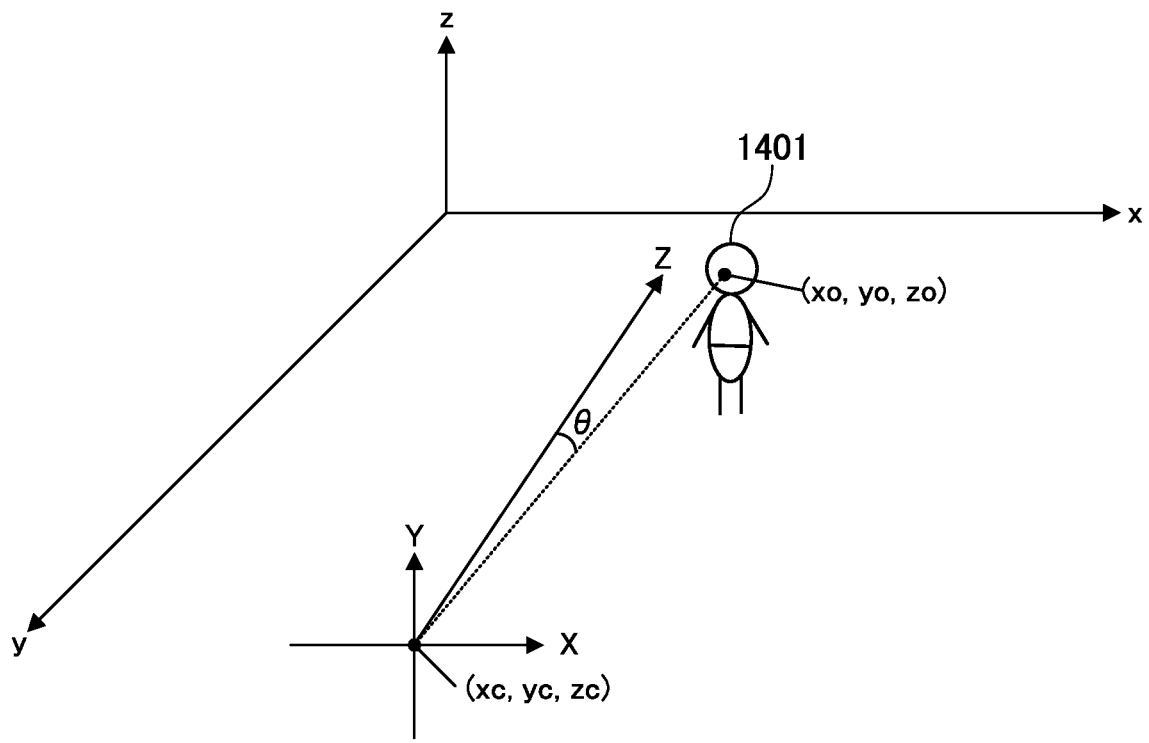
FIG. 14 is a diagram illustrating an example of camera coordinate system setting in Embodiment 1.

FIG. 14 is a diagram illustrating an example of camera coordinate system setting in Embodiment 1, in which a coordinate position of a front mark of a subject model 1401 placed in a three-dimensional coordinate space is represented by (xo, yo, zo) in the xyz coordinate system, and an imaging position is represented by (xc, yc, zc) in the xyz coordinate system.

Here, a coordinate position (Xo, Yo, Zo) of a front mark of a subject model in the camera coordinate system (XYZ coordinate system) is given by Formulas 1 to 3 below.

$$Xo = d \times \sin\theta \quad \text{(Formula 1)}$$

$$Yo = zo \quad \text{(Formula 2)}$$

$$Zo = d \times \cos\theta \quad \text{(Formula 3)}$$

Here, d is a distance between the camera position (xc, yc, zc) and the front mark (xo, yo, zo), and θ is an angle formed by a straight line connecting an imaging direction, the camera position (xc, yc, zc), and the front mark (xo, yo, zo).

Subsequently, in step S1305, a simulation image is generated by projecting an image of a subject onto a projection surface which is set in the camera coordinate system (XYZ coordinate system).

Figure 15:
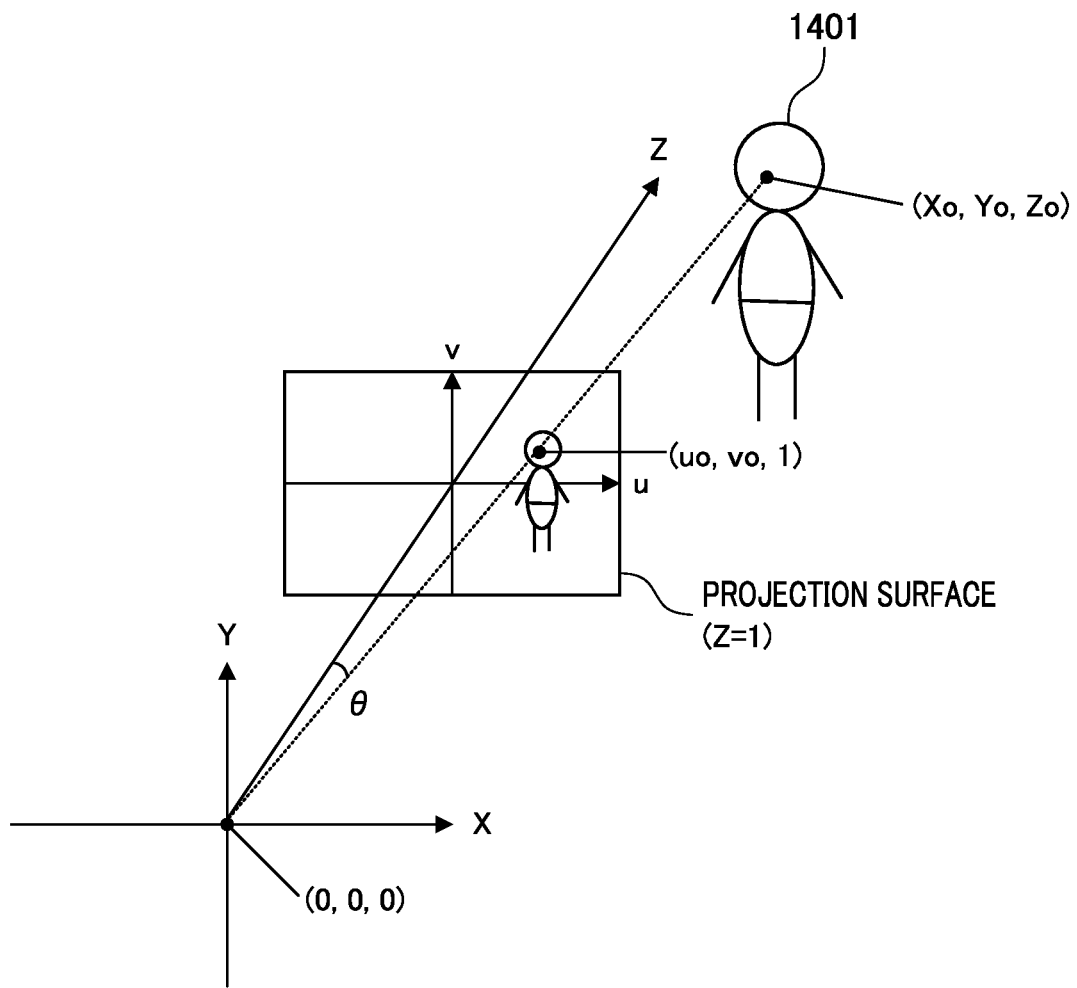
FIG. 15 is a diagram illustrating an example of a projection of a subject model image on a projection surface in Embodiment 1.

FIG. 15 is a diagram illustrating an example of projection of a subject model image onto a projection surface in Embodiment 1. The projection surface is set to Z=1 in the camera coordinate system, as illustrated in FIG. 15.

An imaging position in the camera coordinate system, that is, an intersection point (uo, vo) of a straight line connecting the origin (0, 0, 0) and the front mark (Xo, Yo, Zo) with the projection surface is an imaging position of the front mark and is calculated by Formulas 4 and 5 below.

$$uo=Xo/Zo \quad \text{(Formula 4)}$$

$$vo=Yo/Zo \quad \text{(Formula 5)}$$

Similarly, all regions of the subject model disposed in a three-dimensional virtual space are projected onto the projection surface using the above-described formulas.

However, in a case where an angle θ formed by an imaging direction (Z-axis) and a straight line connecting an imaging position and a subject position is larger than the imaging angle-of-view set in step S1303, it indicates a space outside an imaging region and is excluded from projection.

By performing steps S1301 to S1305 described above, a simulation image as illustrated in FIG. 16 can be generated.

Figure 16A:
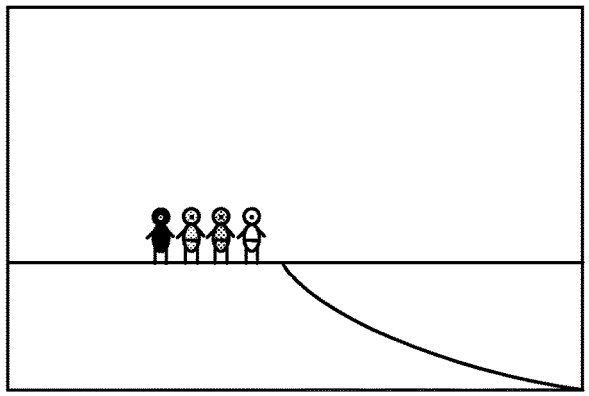
FIGS. 16A and 16B are diagrams illustrating examples of generated simulation images in Embodiment 1.
Figure 16B:
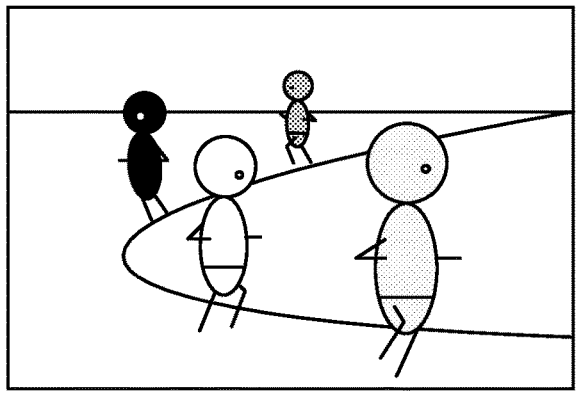

FIGS. 16A and 16B are diagrams illustrating examples of generated simulation images in Embodiment 1. FIG. 16A illustrates a simulation image obtained in a case where imaging is performed at the imaging angle-of-view F0 in a direction of the imaging direction D4 from the imaging position P13 at time T0.

FIG. 16B is a simulation image obtained in a case where imaging is performed at the imaging angle-of-view F6 in a direction of the imaging direction D1 from the imaging position P10 at time T2.

Further, the simulation image generation unit 102 may create a predetermined pose in advance based on the content of the event held, based on a polygonal image of a model of a person who is a subject, in accordance with the content of the event.

In addition, after changing the direction of the pose in accordance with the direction corresponding the spatial position and shape recognized from the current scenery, the direction of the pose may be superimposed on the current scenery image simulation image to form a simulation image.

Thereby, a more realistic simulation image can be generated. A method of posing a 3D model is the same as for 3D games and the like and is already widely known, and thus a detailed description thereof is omitted here.

In addition, processing for recognizing a spatial position and shape from a scenery image and superimposing a model is also referred to as augmented reality (AR), virtual reality (VR), mixed reality (MR), and the like and is widely known, and thus a detailed description thereof is omitted here.

Figure 17:
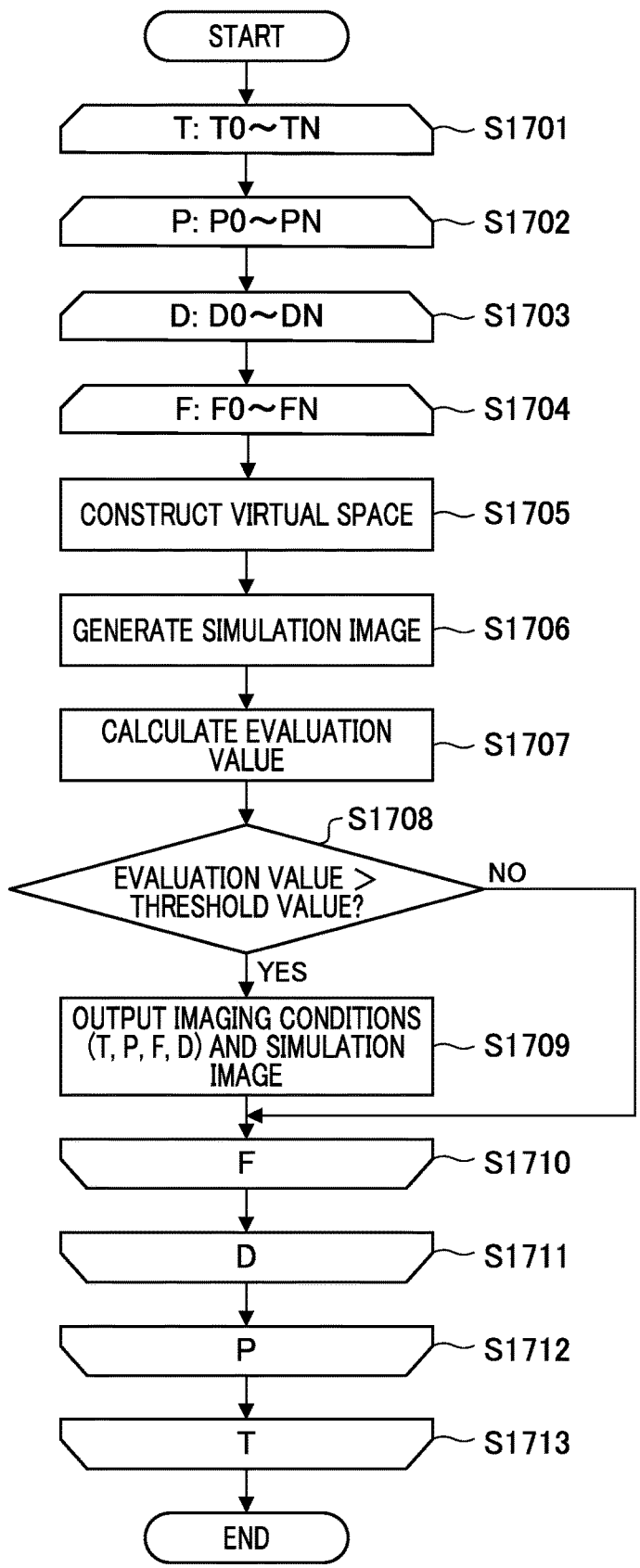
FIG. 17 is a flowchart of evaluation value calculation in Embodiment 1.

The evaluation unit 103 sequentially evaluates simulation images obtained when a virtual space is imaged under various conditions, based on program information of an event, imaging information, and pieces of information of desired captured images which are input to the information input unit 100. FIG. 17 is a flowchart for evaluation value calculation in Embodiment 1, and a flow for sequentially performing evaluation of imaging will be described with reference to FIG. 17.

Steps S1701 to S1702 are loops for assigning various imaging conditions. In this example, the imaging conditions are changed in order in a round-robin manner, but the method of changing imaging conditions is not limited thereto. Some algorithm may be used to efficiently narrow down and change only necessary conditions.

In FIG. 17, an elapsed time of an event, the position of a camera, the direction of the camera, and a focal length of a camera lens are targets for changing imaging conditions, and each time is indicated by T, the position is indicated by P, the direction is indicated by D, and the focal length is indicated by F.

Step S1701 is a loop for sequentially changing and evaluating T (time) exhaustively in a range of T0 to TN, Step S1702 is a loop for sequentially changing and evaluating P (position) exhaustively in a range of P0 to PN, Step S1703 is a loop for sequentially changing and evaluating D (direction) exhaustively in a range of D0 to DN, and Step S1704 is a loop for sequentially changing and evaluating F (focal length) exhaustively in a range of F0 to FN. N is an integer.

Step S1705 is processing for the virtual space construction unit 101 to construct a virtual space under conditions based on a loop variable T. Step S1706 is processing for generating a simulation image in a case where imaging is performed under imaging conditions based on loop variables P, D, and F.

In step S1707, the evaluation unit 103 obtains imaging information (the number of subjects, the position of a face, the size of a face, and the direction of a face) from the simulation image generated in step S1706 by image recognition. Further, in the desired captured image selected from among the plurality of captured images, the highest degree of similarity to the desired captured image is calculated as an evaluation value.

The degree of similarity is set to be a value obtained by multiplying the degree of similarity for each item obtained in the range of 0% (no similarity) to 100% (match) for each item of the imaging information by all items. Details will be described later.

Steps S1708 and S1709 are processing in which the notification unit 104 notifies the user of the simulation image and imaging conditions based on the evaluation result calculated in step S1707. Details will be described later.

Steps S1710 to S1713 represent determination regarding whether to continue loop processing regarding the time T, the position P, the direction D, and the focal length F, and the processes of steps S1705 to S1709 are repeated until all of the conditions are exhausted.

Figure 18:
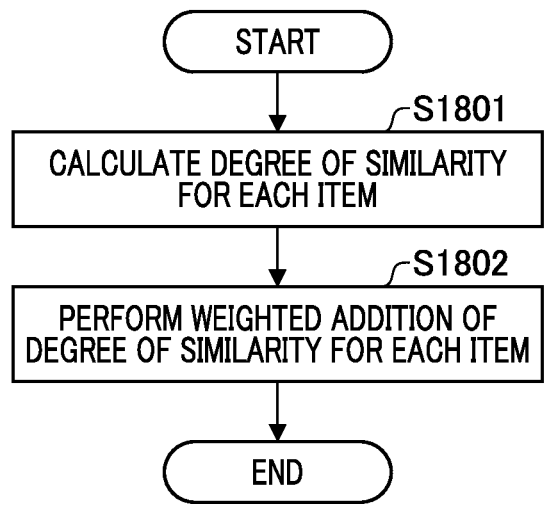
FIG. 18 is a flowchart of similarity degree calculation in Embodiment 1.

Next, FIG. 18 is a flowchart of similarity degree calculation in Embodiment 1, and evaluation of the degree of similarity which is performed by the evaluation unit 103 in step S1707 will be described in detail with reference to FIG. 18.

As illustrated in the flowchart of FIG. 18, the evaluation of the degree of similarity is performed in two steps, that is, calculation of the degree of similarity for each item in step S1801, and weighted addition of the degree of similarity for each item in step S1802.

First, the calculation of the degree of similarity for each item in step S1801 will be described. In step S1801, the degree of similarity is calculated for each of items, that is, the number of subjects, the position of a face, the size of a face, and the direction of a face in a simulation image.

That is, the degree of similarity for the number of subjects people (Mnum), the degree of similarity for the position of a face (Mpos), the degree of similarity for the size of a face (Msize), and the degree of similarity for the direction of a face (Mdir) are calculated.

Regarding the degree of similarity for the number of subjects people (Mnum), in a case where the number of subjects in imaging based on imaging conditions (T, P, D, F) of interest is assumed to be n, and the number of subjects associated with a desired captured image is assumed to be m, an absolute value of m-n is defined as a difference in the number of subjects. The degree of similarity is obtained from the difference in the number of subjects.

Figure 19:
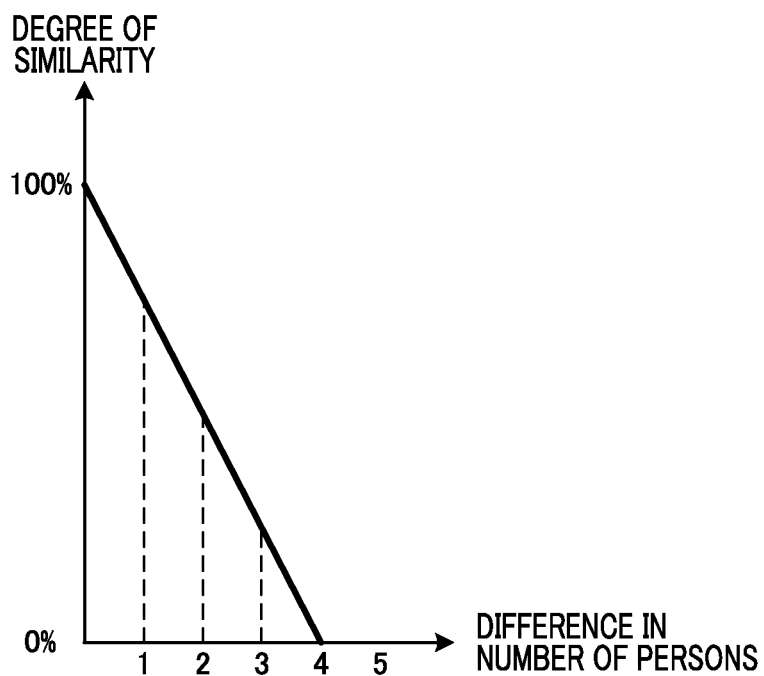
FIG. 19 is a diagram illustrating an example of a graph for similarity degree calculation regarding the number of subjects in Embodiment 1.

FIG. 19 is a diagram illustrating an example of a graph for similarity degree calculation regarding the number of subjects in Embodiment 1, in which the difference in the number of subjects is plotted on a horizontal axis and the degree of similarity is plotted on a vertical axis. Note that, as a difference in the number of subjects decreases in FIG. 19, the degree of similarity decreases linearly. However, this is merely an example, and a curve is also applicable.

Regarding the degree of similarity for the position of a face (Mpos), an Euclidean distance between the position of the center of the subject's face (Xc, Yc) in imaging based on the imaging conditions (T, P, D, F) of interest and the position of the center (Xs, Ys) of the face associated with the desired captured image is obtained. The degree of similarity is obtained from the Euclidean distance.

Figure 20:
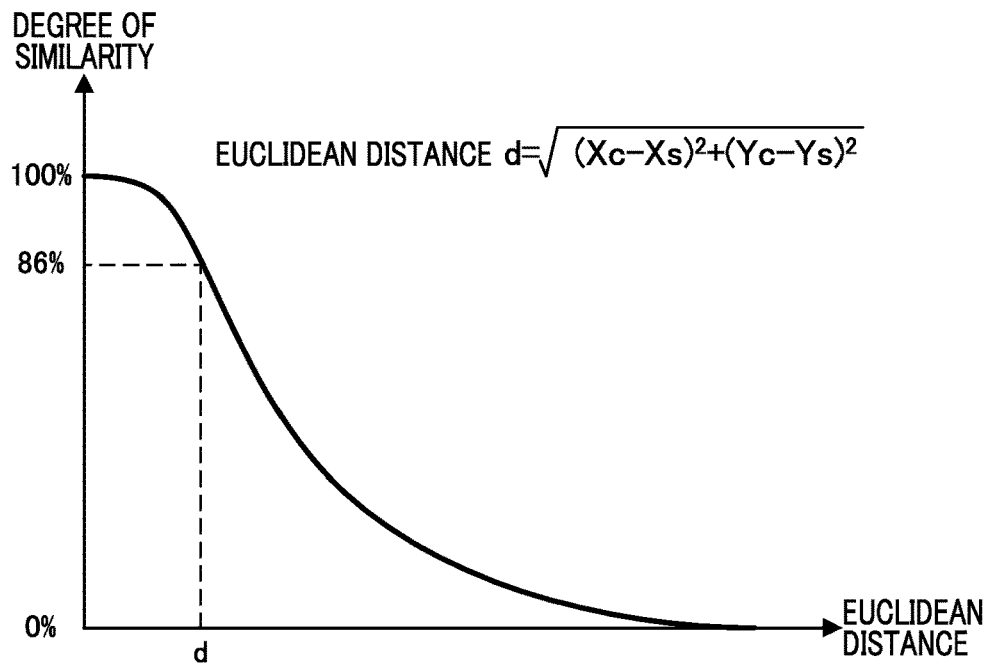
FIG. 20 is a diagram illustrating an example of a graph for similarity degree calculation regarding the position of a face in Embodiment 1.

FIG. 20 is a diagram illustrating an example of a graph for similarity degree calculation regarding the position of a face in Embodiment 1, in which an Euclidean distance is plotted on a horizontal axis and the degree of similarity is plotted on a vertical axis. A curve shown in the graph of FIG. 20 is an example, and a different shape may be used. The imaging conditions of interest include a plurality of faces, and the desired captured image also includes a plurality of faces. However, a combination having the smallest Euclidean distance is paired to obtain its similarity.

The degree of similarity for the size of a face (Msize) is calculated using the size of a face indicated by a radius from the center of the face. The degree of similarity is calculated by paired combinations during the calculation of the degree of similarity between the positions of the faces.

In a case where the size of the face in imaging based on the imaging conditions (T, P, D, F) of interest is assumed to be Rc, and the size of the face associated with the desired captured image is assumed to be Rs, an absolute value of Rs-Rc is defined as a difference in the size of a face Rd.

Figure 21:
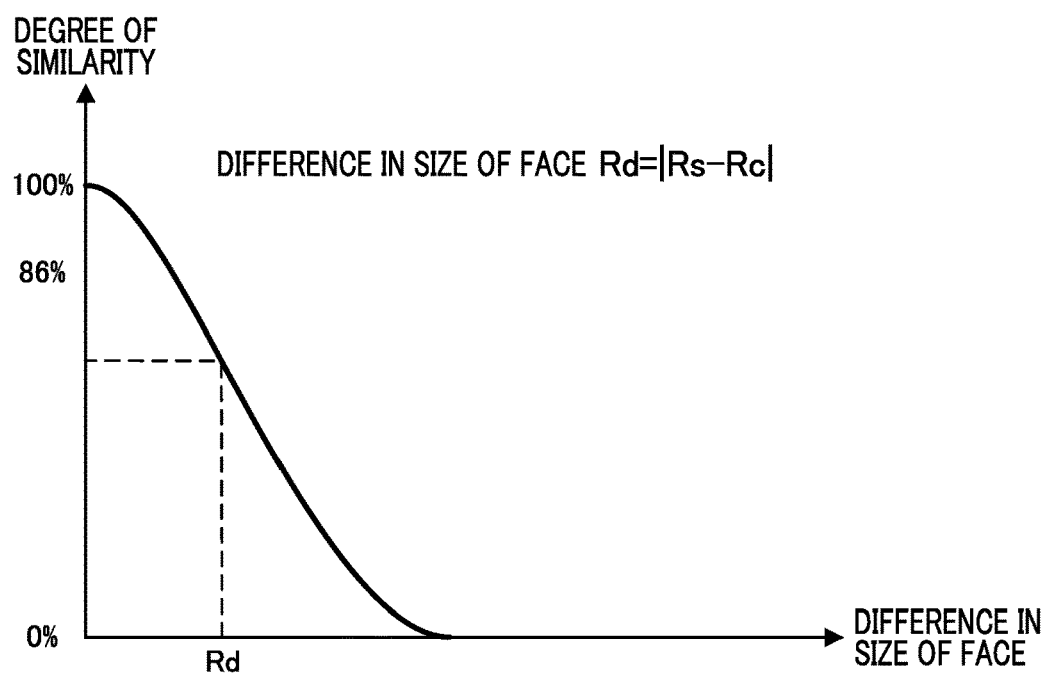
FIG. 21 is a diagram illustrating an example of a graph for similarity degree calculation regarding the size of a face in Embodiment 1.

FIG. 21 is a diagram illustrating an example of a graph for similarity degree calculation regarding the size of a face in Embodiment 1, in which the difference in the size of a face Rd is plotted on a horizontal axis, and the degree of similarity is plotted on a vertical axis.

A curve shown in the graph of FIG. 21 is also an example, and a different shape may be used.

Regarding the degree of similarity for the direction of a face (Mdir), similarity is evaluated using the direction of the subject's face in imaging based on the imaging conditions (T, P, D, F) of interest and the direction of the face associated with the desired captured image as direction vectors on a three-dimensional space.

Figure 22:
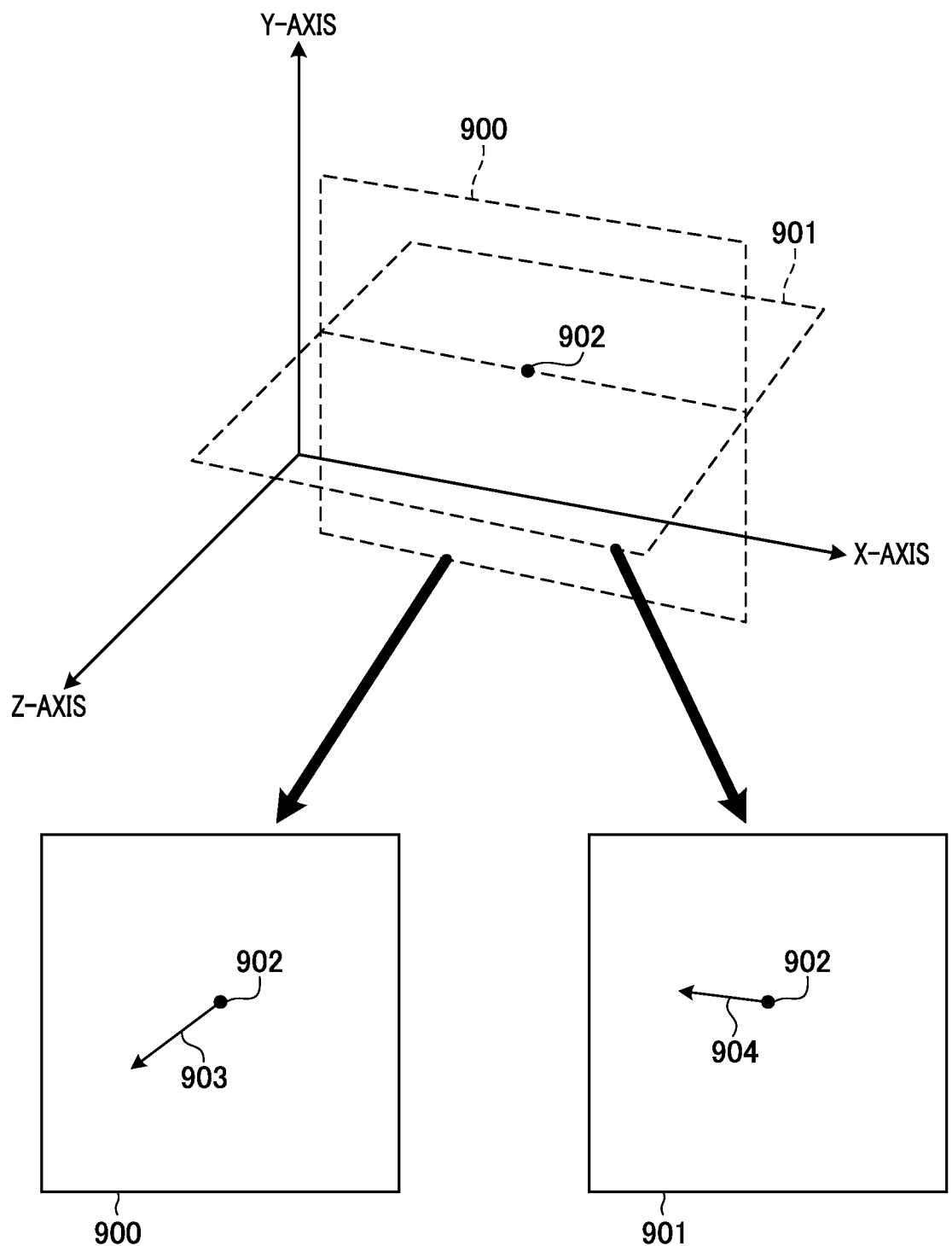
FIG. 22 is a diagram illustrating an image of a similarity degree calculation method regarding the direction of a face in Embodiment 1.

FIG. 22 is a diagram illustrating an image of a similarity degree calculation method regarding the direction of a face in Embodiment 1; in which an X-Y plane 900 including the center coordinates of a face of interest is cut out, a vector indicating the direction of the face is projected on the plane, and a direction in which the projected vector faces is obtained.

The direction of the subject's face in the imaging based on the imaging conditions of interest and the direction of the face associated with the desired captured image are superimposed on each other, and a smaller angle out of angles formed by the two vectors is obtained. An absolute value of a difference in angle is between 0 degrees and 360 degrees, and when the value exceeds 180 degrees, the smaller angle can be obtained by subtracting the angle from 360 degrees.

The degree of similarity on the X-Y plane 900 is obtained by associating the smaller angle values 0 degrees to 180 degrees with 100% to 0%. The degree of similarity on a X-Z plane 901 is similarly obtained, and a value obtained by multiplying the degree of similarity in the X-Y plane 900 by the degree of similarity in the X-Z plane 901 is set to be the degree of similarity between the directions of the two faces.

Next, weighted addition of the degree of similarity for each item in step S1802 will be described.

desired image information and the degree of similarity (Mtotal) of the entire simulation image are obtained by performing weighted addition of the degrees of similarity (Mnum, Mpos, Mdir, Msize) calculated in S1801 by using a weighting factor for the degree of similarity for each of the items.

When a weighting factor for the number of faces is assumed to be Wnum, a weighting factor for the position of a face is assumed to be Wpos, a weighting factor for the direction of a face is assumed to be Wdir, and a weighting factor for the size of a face is assumed to be Wsize, Mtotal can be represented by, for example, Formula 6.

$$Mtotal = Wnum \times Mnum + Wpos \times Mpos + Wsize \times Msize + Wdir \times Mdir \quad \text{(Formula 6)}$$

Here, the values of Wnum, Wpos, Wsize, and Wdir are set to different values depending on selected desired image information.

Figure 23A:
FIGS. 23A to 23C are diagrams illustrating examples of setting of a weighting factor for each desired captured images in Embodiment 1.
Figure 23B:
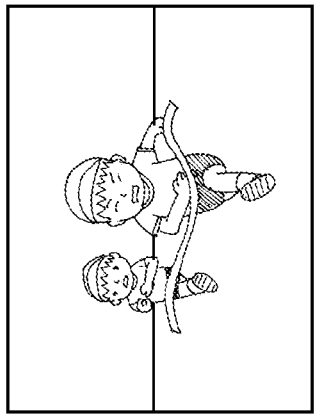
Figure 23C:
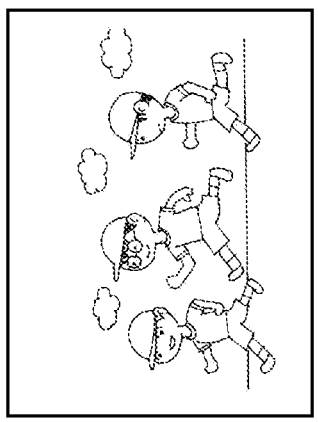

FIGS. 23A to 23C are diagrams illustrating examples of setting of a weighting factor for each desired captured images in Embodiment 1.

FIG. 23A is an example of a desired captured image, which is a photo image from which the overall atmosphere can be seen. In the case of such an image, an image closer to the desired captured image in which a plurality of subjects (students) and a background are imaged can be extracted by increasing the weights of the number of faces and the sizes thereof.

FIG. 23B is an example of a desired captured image, which is a photo image of a scene in which a specific event has occurred. In the case of such an image, it is possible to evaluate individual degrees of similarity in a well-balanced manner by equally setting all weighting factors and to extract an image that is closer to the desired captured image.

FIG. 23C is an example of a desired captured image, which is a photo image in which a close-up of a subject's facial expression is taken. In the case of such an image, it is possible to extract a simulation image in which a subject's facial expression can be confirmed more clearly by setting large weighting factors of the size and direction of a face.

Note that, when weighting calculation is performed, the degree of similarity is calculated for at least two of the number of subjects, the position of a face, the size of a face, and the direction of a face, and an evaluation value may be calculated using a weighting factor which is set in accordance with a desired captured image.

Next, details of processing of the notification unit 104 will be described.

The notification unit 104 compares the degree of similarity (Mtotal) calculated by the evaluation unit 103 with a preset threshold value Th. In a case where Mtotal is larger than Th, that is, only when the degree of similarity is relatively high, a user is notified of predetermined imaging conditions.

That is, the user is notified of a simulation image, and the imaging position (P), the direction (D), the angle of view (F), the time (T) of a program, and the like which are used when generating the simulation image. examples of a notification method include output to a display device which is not illustrated in the drawing, printing output using a printing device, data transmission to equipment connected to an external medium or a network, and the like.

As described above, according to Embodiment 1 of the present invention, since imaging conditions for obtaining a desired captured image can be automatically extracted using a simulation, it is possible to extract imaging conditions for obtaining the desired captured image more accurately without bringing a large number of imaging equipment to the site in advance.

In addition, the degrees of similarity for the number of subjects and the position, size, and direction of a face are evaluated using different weightings in accordance with a desired captured image, and thus it is possible to more effectively extract imaging conditions for obtaining an image closer to the desired captured image.

Embodiment 2

Next, Embodiment 2 of the present invention will be described. In Embodiment 2, in addition to an imaging position and imaging conditions for obtaining a desired captured image, a moving route for sequentially performing imaging under the imaging conditions is calculated and notified to a user.

Figure 24:
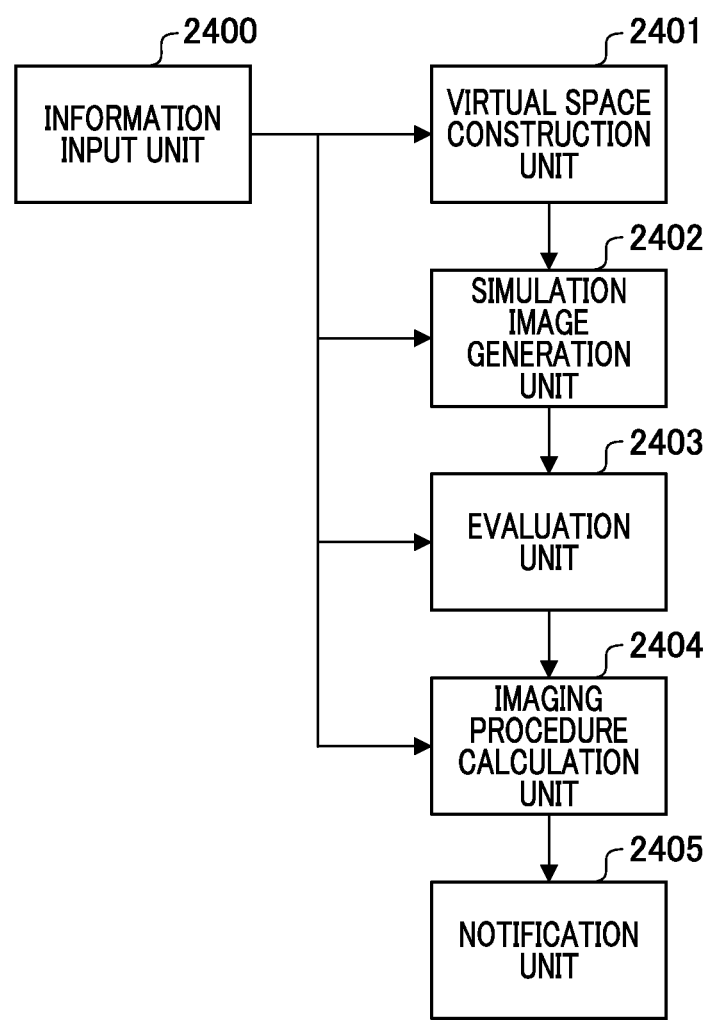
FIG. 24 is a block diagram illustrating a configuration example of a simulation device in Embodiments 2 and 3.

FIG. 24 is a block diagram illustrating a configuration example of a simulation device in Embodiments 2 and 3. Reference numerals 2400 to 2403 and 2405 in FIG. 24 have substantially the same configurations as those of reference numerals 100 to 103 and 104 in FIG. 1 and have substantially the same configurations as those in Embodiment 1, but an imaging procedure calculation unit 2404 is added. In addition, there is a difference in an input to the information input unit 2400 and processing contents of the evaluation unit 2403.

Description is given focusing on differences from Embodiment 1. First, as event information to be input to the information input unit 2400, information including a region that allows invasion (entrance) for imaging, a region that does not allow invasion (entrance), and the positions and sizes of surrounding obstacles is added.

The region that allows invasion (entrance) for imaging, the region that does not allow invasion, the positions and sizes of surrounding obstacles, and the like are input based on information provided by an event organizer or the like.

Figure 25:
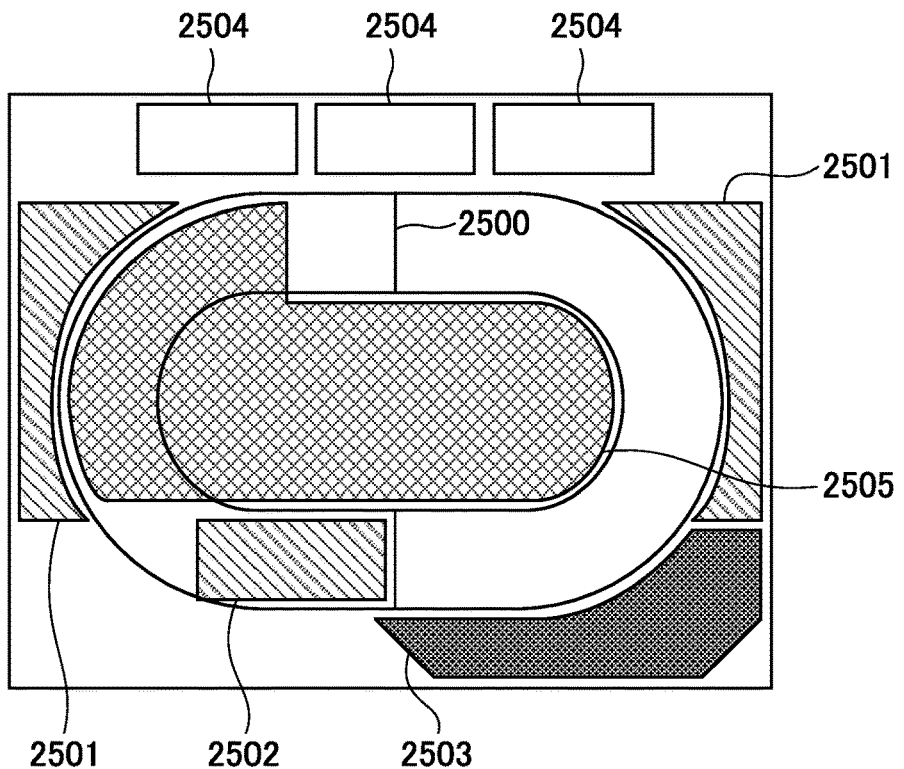
FIG. 25 is a diagram illustrating an image of a region that allows invasion in a foot race in Embodiments 2 and 3.

FIG. 25 is a diagram illustrating an image of a region that allows invasion for imaging in a foot race in Embodiments 2 and 3. A race track 2500 drawn on the ground of an elementary school which is an event venue, children's seats 2501 disposed along the circumference of the race track, children 2502 who are waiting for their turn to run, and parents' seats 2503 who came to see their children are provided.

Further, there are regions (objects) 2504 that do not allow invasion such as tents and school buildings, and a region that allows invasion is input by an input unit such as a GUI, the region not overlapping the above-described regions and also taking a region used for a race into consideration.

Next, the evaluation unit 2403 will be described. A processing flow of the evaluation unit 2403 is substantially the same as the flow shown in the flowchart of FIG. 17 described in Embodiment 1.

Further, an imaging position in step S1702 is sequentially evaluated in more detail based on information such as a region that allows invasion for imaging, which is additionally input by the information input unit 2400.

For example, an event venue is divided into meshes at regular intervals, and regions that are intersections of the meshes and allow invasion for imaging are sequentially selected. The order does not matter.

Figure 26:
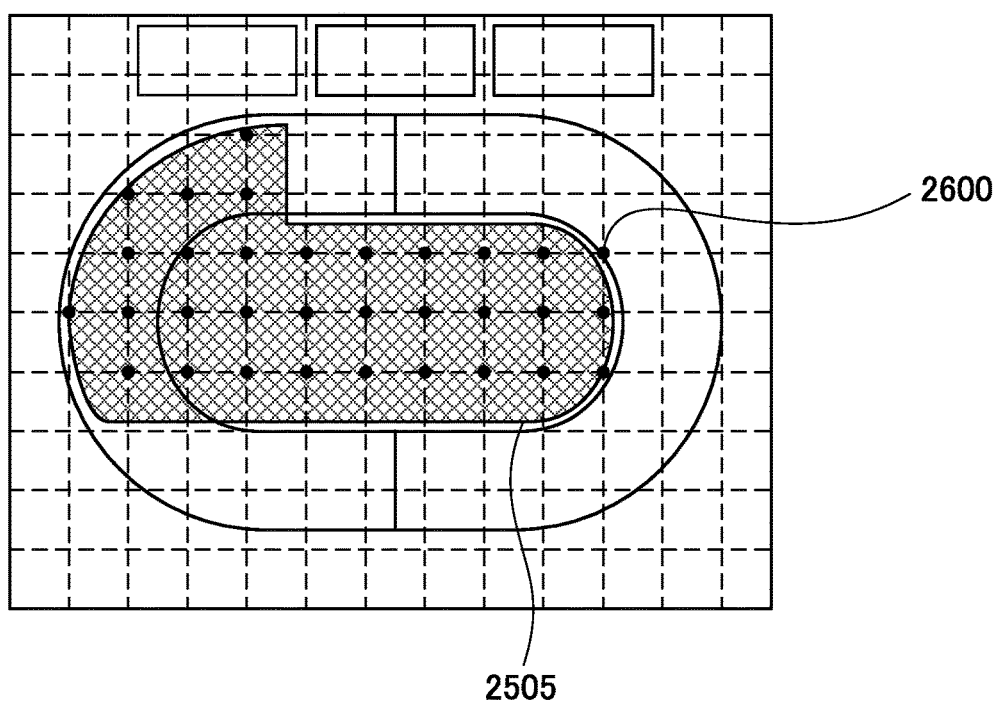
FIG. 26 is an image diagram of positional information to be selected sequentially in Embodiments 2 and 3.

FIG. 26 is an image diagram of positional information to be sequentially selected in Embodiments 2 and 3. Intersections of the meshes that exist inside a region 2505 allowing invasion are assumed to be positional information 2600. As illustrated in FIG. 26, there are a plurality of pieces of positional information 2600. All of the pieces of positional information 2600 are sequentially evaluated for imaging.

The imaging procedure calculation unit 2404 is a unit that obtains a candidate for a moving route based on evaluation values obtained for the imaging conditions (T, P, D, F).

Figure 27:
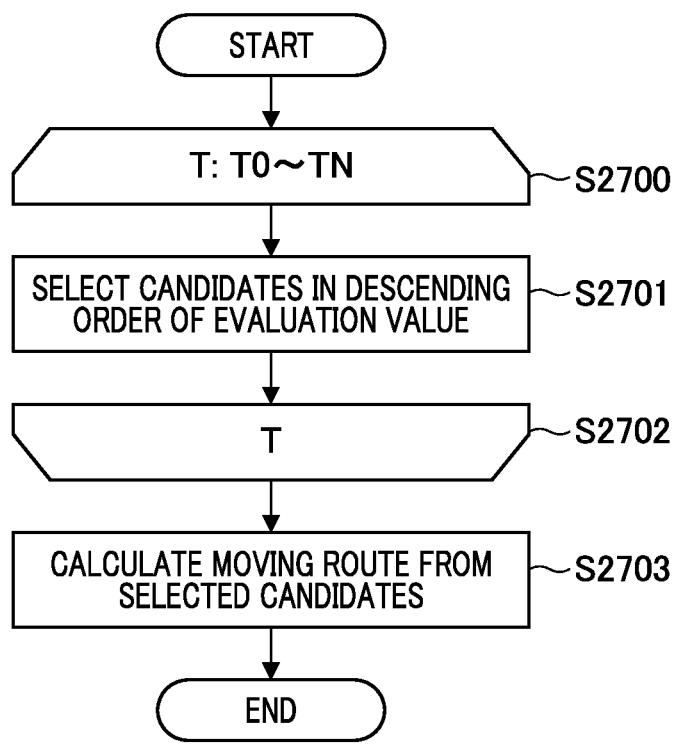
FIG. 27 is a processing flowchart of imaging procedure calculation in Embodiments 2 and 3.

FIG. 27 is a processing flowchart of imaging procedure calculation in Embodiments 2 and 3. In a loop of step S2700 in FIG. 27, the evaluation values for the imaging conditions (T, P, D, F) are scanned in order from time T0 to time TN. At T0, a predetermined number of imaging conditions (T0, P, D, F) are selected in descending order of the evaluation value in step S2701.

At times other than T0, positions are narrowed down to only positions P movable with a time difference between the time of interest and the previous time from a position P selected at the previous time. In addition, the imaging conditions (T, P, D, F) are scanned, and a predetermined number of imaging conditions (T0, P, D, F) are selected in descending order of the evaluation value in step S2701.

In step S2703, the imaging conditions (T0, P, D, F) with the large evaluation values obtained in step S2701 are connected in the order of time, which is an imaging order. Since a predetermined number of imaging conditions are selected per time, the ranks of the same evaluation values are connected to each other to calculate a predetermined number of moving routes.

The notification unit 2405 in FIG. 24 displays a plurality of moving routes obtained to be superimposed on a captured background image (live-view image) on a monitor (display device) such as a camera, a head-mounted display, a PC, a smartphone, or a tablet. Then, a user can select one of the plurality of moving routes.

Figure 28:
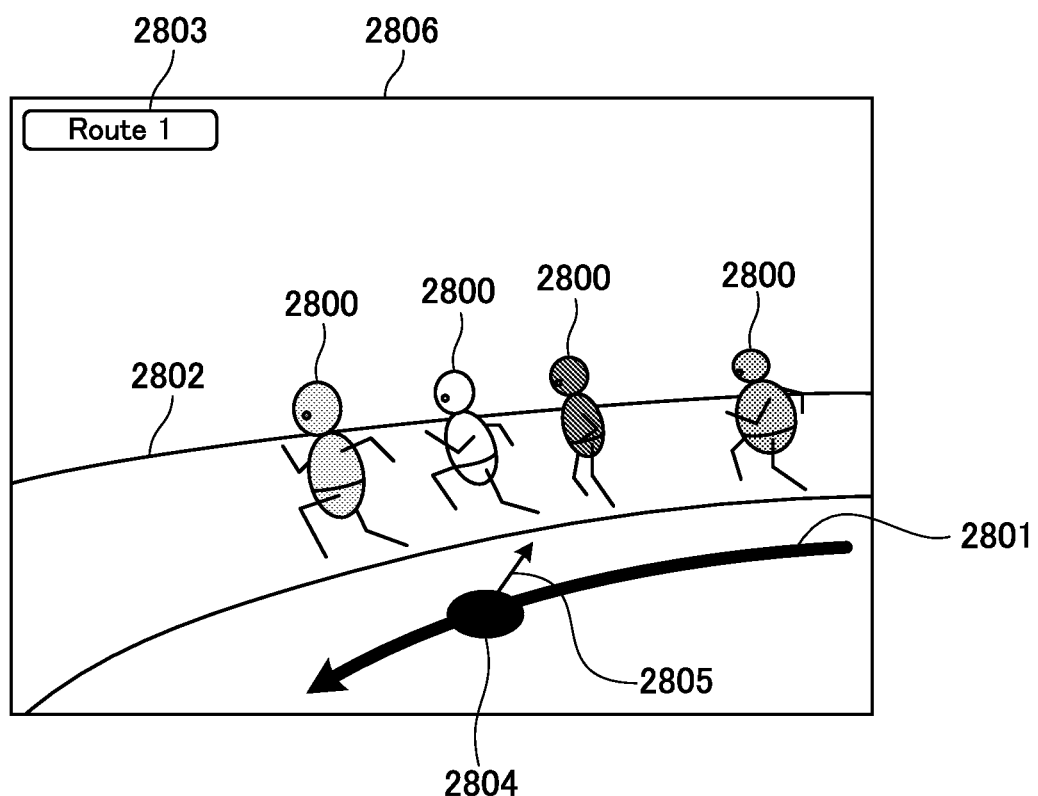
FIG. 28 is an image diagram of display on a monitor in Embodiments 2 and 3.

FIG. 28 is an image diagram of display on a monitor in Embodiments 2 and 3. The displayed contents include a subject model 2800, a moving route display 2801, an imaging background 2802, a currently selected moving route display 2803 which is the display of a number of a selected moving route, an imaging point 2804, an imaging direction 2805, and a monitor screen 2806.

This is a minimum display, and other displays are applicable. There are two types of display contents, that is, one for location hunting and the other for actual imaging. Each of them will be described below.

In the display during location hunting before an event, the current scenery is imaged on the monitor screen 2806 with, for example, a camera mounted on a smartphone, and is displayed in real time as the imaging background 2802 (live-view image). The subject model 2800 in a virtual space, the moving route display 2801, the currently selected moving route display 2803, the imaging point 2804, and the imaging direction 205 are displayed on the monitor to be superimposed on the imaging background 2802.

The subject model 2800 is a reproduced image by a 3D model reproduced by a virtual space construction unit 2401, and is generated by computer graphics (hereinafter referred to as CG) or the like. The moving route display 2801 is displayed to be superimposed on a background so that positional relationships thereof match, the background being a background for imaging one of the predetermined number of moving routes calculated on the imaging background 2802.

In order to realize such a display, methods such as known technologies AR, VR, MR, and the like are adopted. The currently selected moving route display 2803 displays to which route the moving route display 2801 corresponds, among the predetermined number of moving routes calculated, using an icon. It is also characterized that a UI for the user to select one of the plurality of moving routes is provided.

Note that imaging information includes a speed at which movement is possible, and the notification unit may calculate a plurality of moving routes based on the speed at which movement is possible, and the user may select one of the plurality of moving routes.

The imaging point 2804 is displayed to be superimposed at a position determined to have a high evaluation value. The imaging direction 2805 is displayed in a form attached to the imaging point 2804 and indicates which direction the user should face when performing imaging at the imaging point 2804.

On the other hand, in the display during the actual imaging, the current scenery is imaged on the monitor screen 2806 with, for example, a camera mounted on a smartphone or the like and is displayed as the imaging background 2802 in real time. The moving route display 2801, the currently selected moving route display 2803, the imaging point 2804, and the imaging direction 2805 are displayed to be superimposed on the imaging background 2802.

The moving route display 2801 is displayed to be superimposed on a background so that positional relationships thereof match, the background being a background for imaging one of the predetermined number of moving routes calculated on the imaging background 2802.

The moving route display 2801 is highlighted at only times near a position corresponding to the current time, and moving routes at the other times are displayed lightly or not displayed. The currently selected moving route display 2803 displays to which route the moving route display 2801 corresponds, among the predetermined number of moving routes calculated, using an icon.

The imaging point 2804 is displayed to be superimposed at a position determined to have a high evaluation value. The imaging direction 2805 is displayed in a form attached to the imaging point 2804 and indicates which direction the user should face when performing imaging at the imaging point 2804.

In this manner, it is possible to confirm for which imaging the calculated moving route is suitable, using a 3D model during location hunting, while imaging can be performed during the actual imaging while viewing the moving route confirmed during the location hunting in a timely manner.

Thereby, a photographer can reduce the burden on the moving route among burdens on the imaging and the moving route that the photographer bears at the time of imaging, and can concentrate more on the imaging.

As a camera used for the actual imaging, not only general still cameras and video cameras, but also remote cameras such as drones may be used.

Embodiment 3

Next, Embodiment 3 of the present invention will be described.

In Embodiment 3, an interference evaluation value for event viewers is also calculated in addition to the moving route calculated in Embodiment 2, and thus a notification of a moving route in which an interference evaluation value is generally uniform for a large number of event viewers (that is, an imaging route that does not interfere with the appreciation of an event) is given.

Since a basic configuration of the present Embodiment is the same as that of Embodiment 2, description will be given focusing on differences therebetween.

The information input unit 2400 also inputs positional information of event viewers in addition to the input data described in Embodiments 1 and 2. The event viewers are participants who come to watch an event, such as parents at a sports day in an elementary school, spectators at events such as a music live show, and the like. Positional information of the event viewers is also input. Note that, in the present Embodiment, a sports day in an elementary school is assumed for the sake of convenience, and event viewers are parents.

The evaluation unit 2403 obtains an interference evaluation value for the event viewers in addition to the evaluations described in Embodiments 1 and 2.

Figure 29:
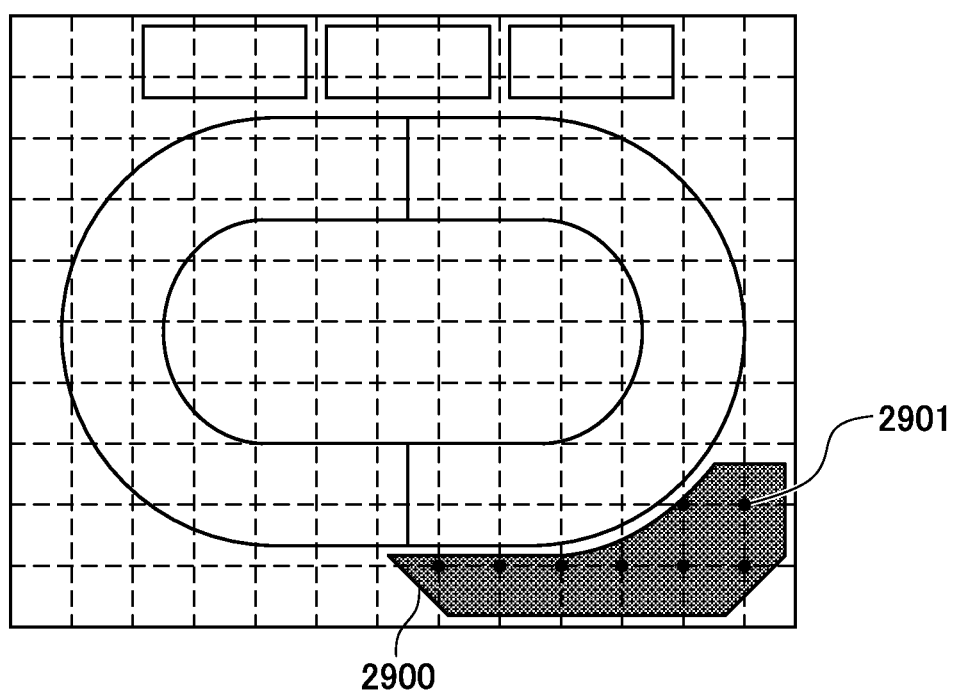
FIG. 29 is an image diagram of a parent seat in Embodiments 2 and 3.

FIG. 29 is an image diagram of parents' seats in Embodiments 2 and 3. For example, as illustrated in FIG. 29, an event venue is divided into meshes at regular intervals, and intersections on the inner side of the parents' seats are selected sequentially. The order does not matter.

In addition, the resolution of the mesh does not need to match the resolution of the mesh used in Embodiment 2, but it is assumed that the mesh having the same resolution is used in the present Embodiment.

Figure 30A:
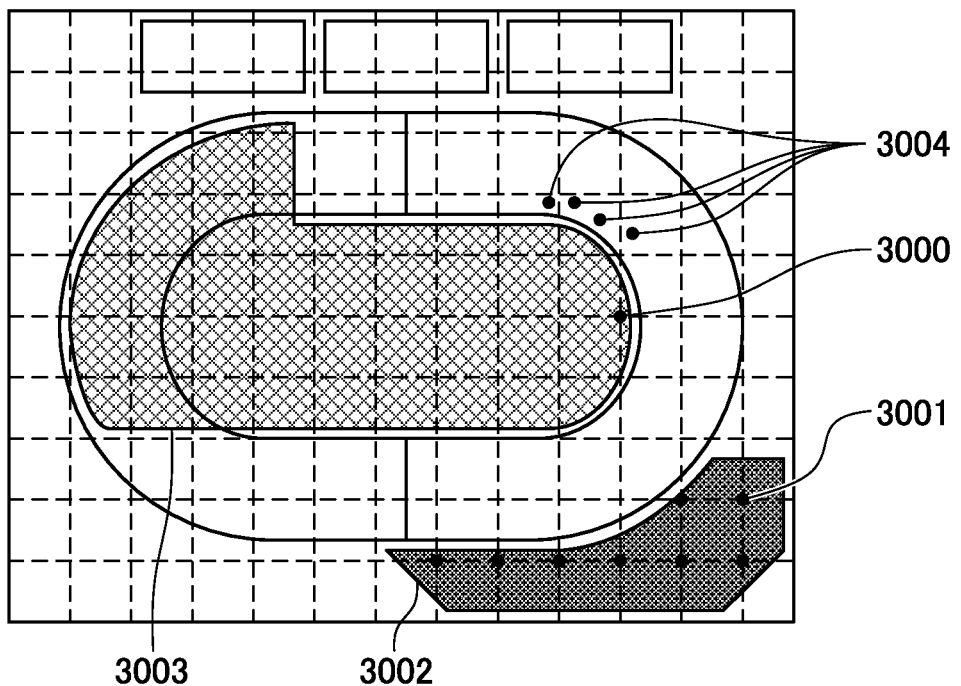
FIGS. 30A and 30B are image diagrams illustrating methods of obtaining interference evaluation values in Embodiments 2 and 3.
Figure 30B:
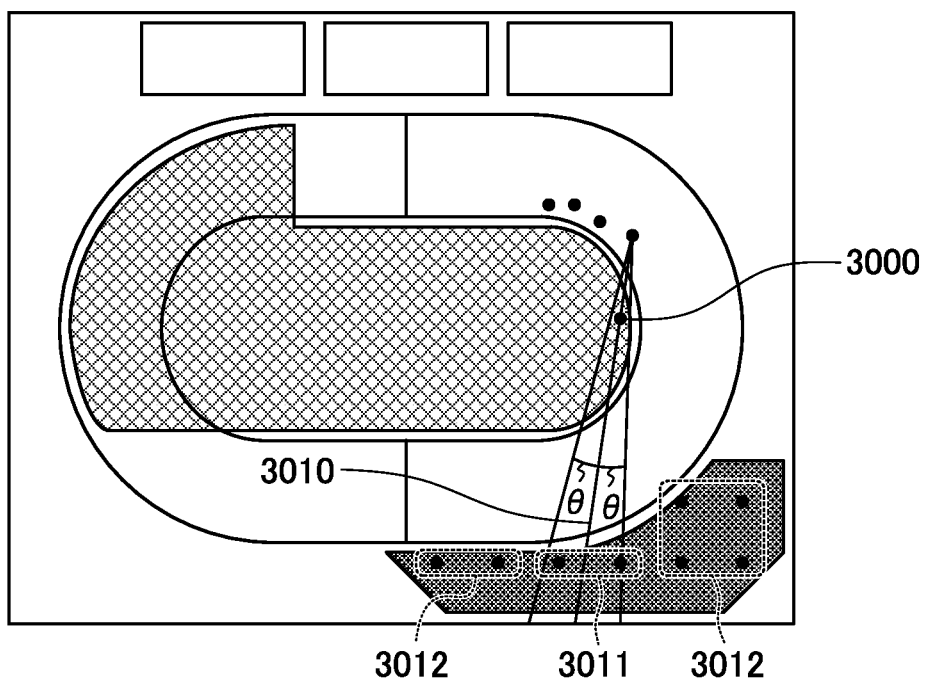

FIGS. 30A and 30B are image diagrams illustrating methods of obtaining interference evaluation values in Embodiments 2 and 3, and examples of positional information 3001 of parents will be described with reference to FIG. 30A.

An interference evaluation value is obtained for one piece of positional information 3000 selected from among the intersections of the meshes that are sequentially selected.

In addition, there is a count value associated with positional information 3001 of all parents, and an initial value is set to 1. Next, a method of obtaining an interference evaluation value will be described with reference to FIG. 30B.

First, one of positions 3004 of a subject model and the selected positional information 3000, which is an imaging position, are connected by a straight line. For an inner range 3011 on the inner side of a range obtained by extending a straight line 3010, which is obtained by extending the end of the straight line on the selected positional information 3000 side, by a predetermined angle θ centering on the position 3004 of the subject model, an associated count value +1 is set to be a temporary count value.

On the other hand, for an outer range 3012 on the outer side of a range obtained by extending the straight line 3010 by the angle θ, an associated count value itself is set to be a temporary count value.

A total value A of all of the count values +1 associated with the positional information 3001 of parents is obtained, a total value B of all of the temporary count values of the positional information 3001 of parents is obtained, and (A-B)/A is treated in the same manner as the degree of similarity.

Note that, in a case where there are a plurality of subject models assumed to be subjects, this value is obtained for all of the subject models, and a value obtained by multiplying all of the above-described ratios is set as an interference evaluation value, which is treated in the same manner as the degree of similarity.

In addition, the overall degree of similarity is obtained by the method described in Embodiment 1, and a possible count value is promoted to the original count value based on the selected positional information 3000 adopted at the time of actually determining a moving route.

By processing this in time series, count values are determined sequentially. This is a mechanism for minimizing the possibility of complaints in cases where there is a concern of complaints from specific parents when staying too long in front of the parents on the day of a sports day.

By treating and adding an interference evaluation value in the same manner as the degree of similarity based on the method in the present Embodiment, it is possible to reduce a problem of unintentionally continuously interfering with the appreciation of children playing games by only specific parents.

In addition, the notification unit may calculate an optimum moving route based on the interference evaluation value.

Embodiment 4

Next, Embodiment 4 of the present invention will be described. In Embodiment 4, the optimal arrangement of a plurality of fixed-point cameras is calculated through simulation.

Figure 31:
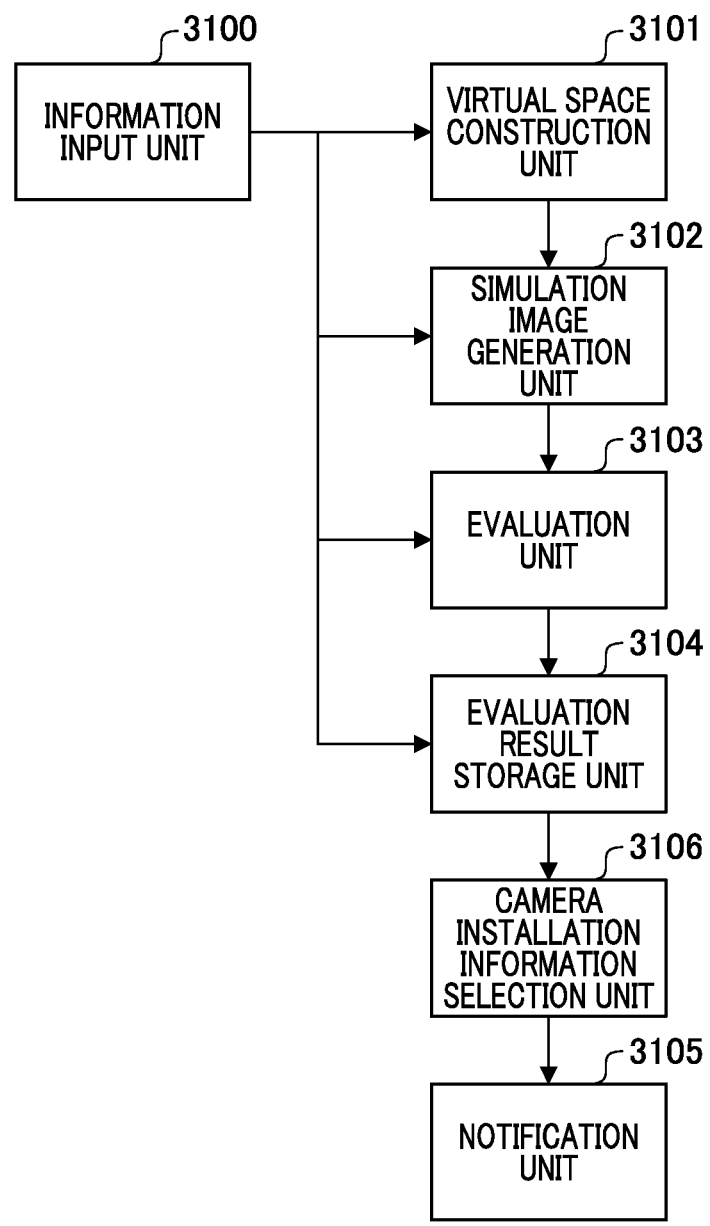
FIG. 31 is a block diagram illustrating a configuration example of a simulation device in Embodiment 4.

FIG. 31 is a block diagram illustrating a configuration example of a simulation device in Embodiment 4. Reference numerals 3100 to 3103 and 3105 in FIG. 31 have substantially the same configuration as those of reference numerals 100 to 103 and 104 in FIG. 1, and an evaluation result storage unit 3104 and a camera installation information selection unit 3106 are added.

Differences from Embodiment 1 will be described. First, regarding the evaluation unit 3103 in FIG. 31, a captured image input by the information input unit 3100 and a simulation image generated by a simulation image generation unit 3102 are compared with each other, and the degree of similarity for each subject model is calculated.

The evaluation result storage unit 3104 is constituted by a memory or the like, and stores the degree of similarity for each subject model output by the evaluation unit 3103, a score obtained by summing the degrees of similarity, and imaging information input to the information input unit 3100 in association with each other as evaluation results.

The camera installation information selection unit 3106 selects imaging information based on the imaging information input to the information input unit 3100 and the evaluation results which are associated with each other and stored by the evaluation result storage unit 3104.

The notification unit 3105 is constituted by a display device such as a liquid crystal panel, and displays the imaging information selected by the camera installation information selection unit 3106 as installation information of the fixed-point cameras.

Next, processing for displaying information regarding installation positions and direction of fixed-point cameras in the present Embodiment will be described with reference to FIGS. 32 to 37 by using processing in a case where four students A to D dance at a sports day as an example.

Figure 32:
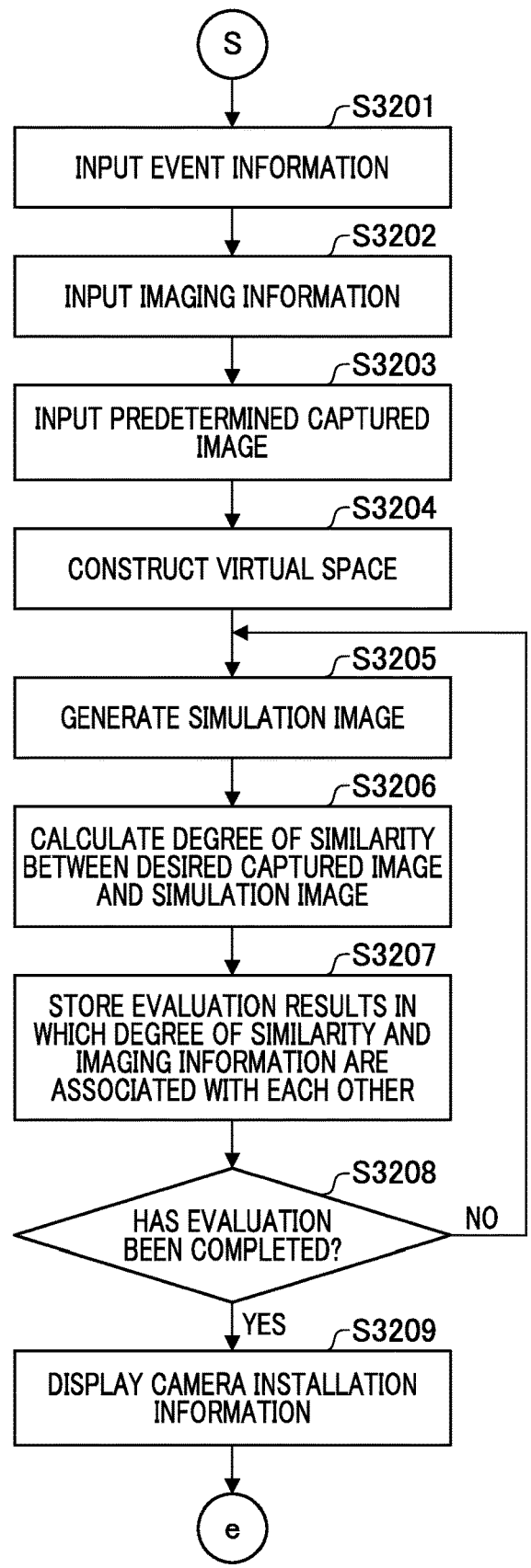
FIG. 32 is a flowchart related to processing for displaying information regarding an installation position and direction of a fixed-point camera in Embodiment 4.

FIG. 32 illustrates a flowchart of processing for displaying information regarding installation positions and direction of the fixed-point cameras in the present Embodiment.

First, in step S3201 of FIG. 32, the region of an athletic field viewed from the sky, and the positions and directions of the faces of the students A to D during the dance performance are input as event information of the information input unit 3100, and the processing proceeds to step S3202.

Figure 33A:
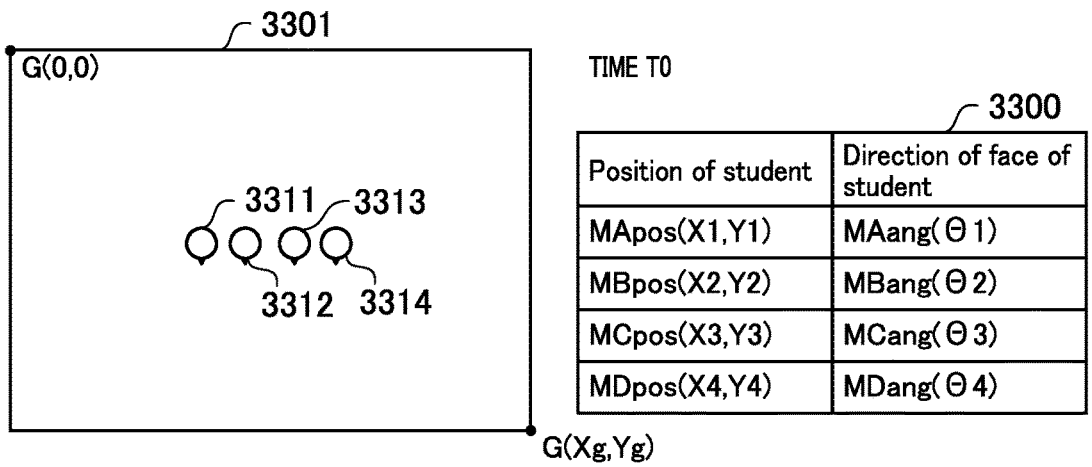
FIGS. 33A to 33C are diagrams illustrating examples of input of event information in Embodiment 4.
Figure 33B:
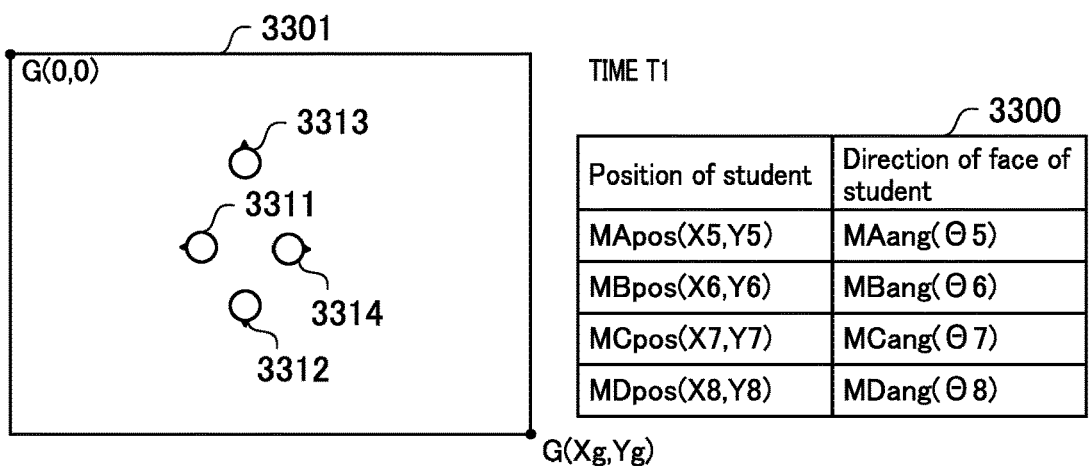
Figure 33C:
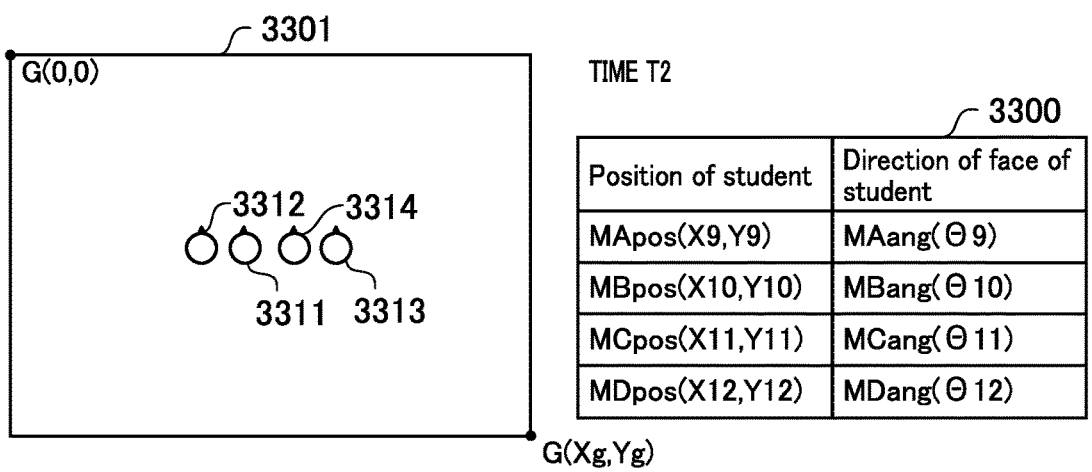

Here, FIGS. 33A to 33C are diagrams illustrating examples of input of event information in Embodiment 4, and the region of an athletic field viewed from the sky, and the positions and directions of the faces of the students A to D during the dance performance which are input as event information in step S3201 will be specifically described with reference to FIG. 33.

Reference numeral 3301 indicates the region of the athletic field and is input as two-dimensional coordinates like G(Xg, Yg) with an upper left side when viewed from the sky as the origin. Reference numerals 3311 to 3314 indicate the positions and directions of the faces of the students A to D.

Reference numeral 3300 indicates a table in which the positions and directions of the faces of the students A to D are input. MApos(Xn, Yn) indicates the position of the center of the face of the student A and is input as two-dimensional coordinates. MBpos(Xn, Yn) indicates the position of the center of the face of the student B and is input as two-dimensional coordinates. MCpos(Xn, Yn) indicates the position of the center of the face of the student C and is input as two-dimensional coordinates. MDpos(Xn, Yn) indicates the position of the center of the face of the student D and is input as two-dimensional coordinates. n is an integer.

Regarding the directions of the faces, angles are input in a case where the north is set to 0 degrees, the east is set to 90 degrees, the south is set to 180 degrees, and the west is set to 270 degrees. MAang($\Theta$n) is an angle indicating the direction of the face of the student A. MBang ($\Theta$n) is an angle indicating the direction of the face of the student B. MCang($\Theta$n) is an angle indicating the direction of the face of the student C. MDang($\Theta$n) is an angle indicating the direction of the face of the student D.

FIG. 33A illustrates the positions and directions of the students A to D when the dance starts at time T0. FIG. 33B illustrates the positions and directions of the students A to D during the dance at time T1 (at a point in time when the time T1 has elapsed). FIG. 33C illustrates the positions and directions of the students A to D when the dance ends at time T2.

In this manner, event information is set by inputting the positions and directions of the students A to D at each time.

Note that, in the present Embodiment, the region of the athletic field and the positions of the students are set as two-dimensional coordinates as viewed from the sky, but may be set as three-dimensional coordinates. In addition, although the direction of the student is set at an angle of one axis viewed from the sky, but may be set at angles of three axes. Further, in the present Embodiment, three states from T0 to T2 are input, but changes with time can be set in more detail as event information by increasing the number of states.

Further, as event information, the degree of priority of 0% (no priority) to 100% (highest priority) may be input as main subject information for each student. The degree of priority is added, and thus it is possible to perform weighting evaluation by multiplying the degree of similarity of each of the students A to D, which is calculated by the evaluation unit 3103 to be described later, by the degree of priority. In addition, the notification unit can give a notification of information regarding the positions and directions of the cameras based on the degree of priority.

In step S3202, the imaging positions, imaging directions, and imaging angles-of-view of the fixed-point cameras are input as the imaging information of the information input unit 3100, and the processing proceeds to step S3203.

Figure 34A:
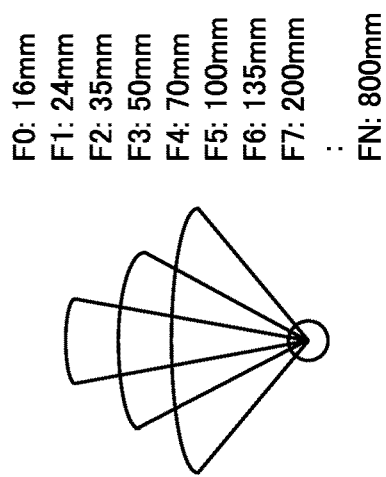
FIGS. 34A to 34C are diagrams illustrating examples of input of imaging information in Embodiment 4.
Figure 34B:
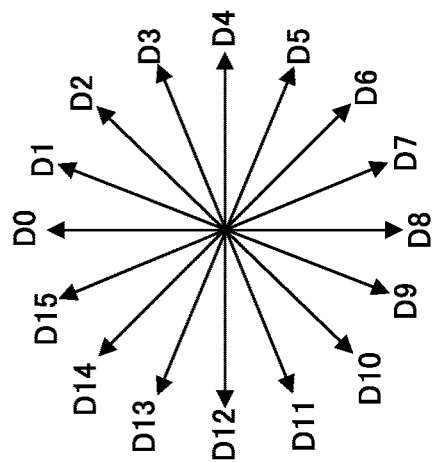
Figure 34C:
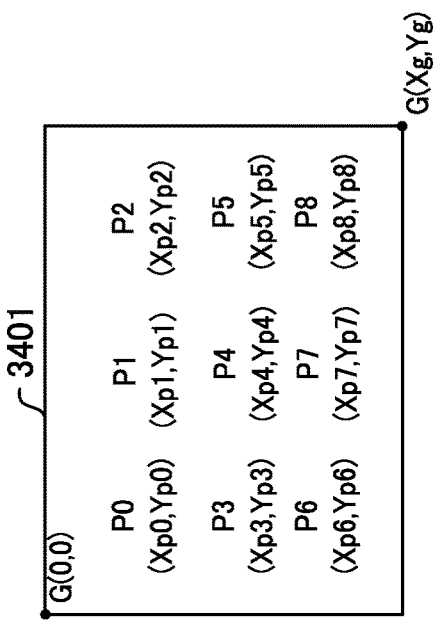

Next, FIGS. 34A to 34C are diagrams illustrating examples of input of imaging information in Embodiment 4. A method of inputting the imaging positions, imaging directions, and imaging angles-of-view of the fixed-point cameras will be specifically described with reference to FIG. 34.

FIG. 34A illustrates the imaging positions, and the positions of the fixed-point cameras that can be set in a region 3401 of an athletic field are input as imaging positions P0(Xp0, Yp0) to P9(Xp9, Yp9) as two-dimensional coordinates. FIG. 34B illustrates the imaging directions, and imaging directions D0 to D15 of the fixed-point cameras are input. FIG. 34C illustrates the imaging angles-of-view, and F indicating the imaging angle-of-view of the fixed-point camera is input.

Note that the number of fixed-point cameras and lens information (for example, a focal length) may be added as imaging information. By adding the number of fixed-point cameras and the lens information and setting imaging information selected by the camera installation information selection unit 3106 to be described later based on the number of fixed-point cameras and the lens information, it is possible to perform display based on the number and fixed-point cameras that can be prepared and the lens information.

That is, the notification unit can give a notification of information regarding the positions of the cameras based on the degrees of similarity, and the number of cameras or the lens information.

Figure 35:
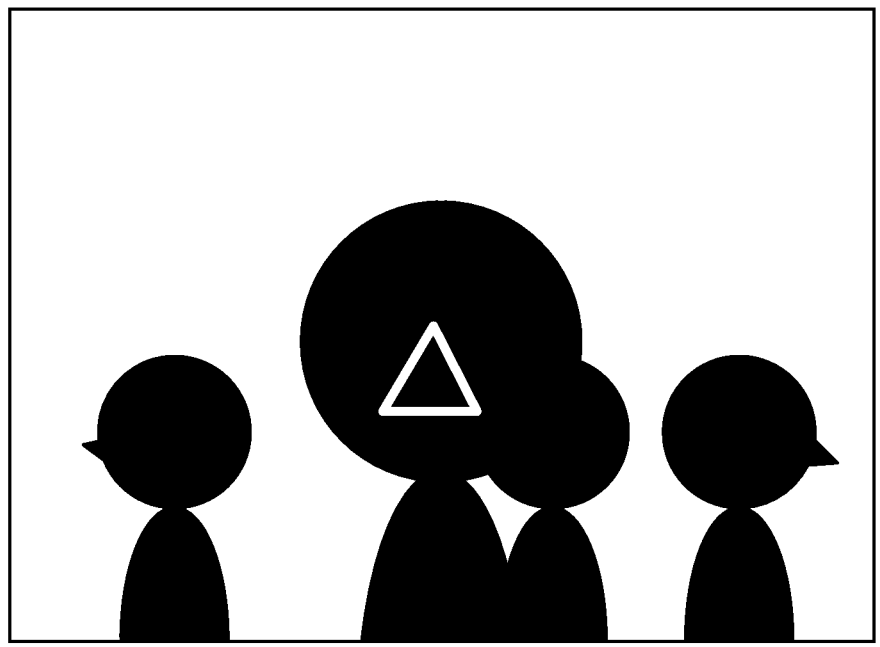
FIG. 35 is a diagram illustrating an example of a desired captured image in Embodiment 4.

FIG. 35 is a diagram illustrating an example of a desired captured image in Embodiment 4. In step S3203, for example, the image in FIG. 35 is input as a desired captured image by the information input unit 3100, and the processing proceeds to step S3204. Note that, although one type of image is input as a desired captured image in the present Embodiment, a plurality of images may be input.

In step S3204, a virtual space in which the state of the dance is reproduced is constructed by a virtual space construction unit 3101 based on the event information input in step S3201, and the processing proceeds to step S3205.

In step S3205, a simulation image is generated based on the desired captured image input in step S3202 and the virtual space constructed in step S3204, and the processing proceeds to step S3206.

In step S3206, the evaluation unit 3103 calculates the degree of similarity for each of the students A to D based on the desired captured image input in step S3203 and the simulation image generated in step S3205, and the processing proceeds to step S3207.

In step S3207, the degree of similarity for each of the students A to D calculated in step S3206 and the imaging information of the fixed-point cameras used at the time of generating the simulation image in step S3205 are associated with each other and stored as evaluation results by the evaluation result storage unit 3104, and the processing proceeds to step S3208.

Here, FIG. 36 is a conceptual diagram illustrating association between the imaging information and the degrees of similarity of the students in Embodiment 4, and illustrates the concept of associating and storing the imaging information of the fixed-point cameras and the degree of similarity of each of the students A to D.

The imaging information (imaging positions, imaging directions, imaging angles-of-view, and time) of the fixed-point cameras used to generate the simulation image is set as parameters of a captured image. Evaluation results store the degree of similarity to the simulation image generated by the above-described parameters of the captured image and a score obtained by summing the degrees of similarity of the students in association with each other.

In step S3208, the input information input by the information input unit 3100 and the evaluation results stored in the evaluation result storage unit 3104 are compared with each other to determine whether or not the evaluation has been completed. In a case where it is determined that the evaluation has been completed, the processing proceeds to step S3209, otherwise input information that has not been evaluated is set, and the processing returns to step S3205.

In step S3209, the camera installation information selection unit 3106 sorts the evaluation results stored in the evaluation result storage unit 3104, for example, in descending order of a score, and the positions, directions, and number of fixed-point cameras are displayed on a display device, and the processing is terminated.

Figure 37A:
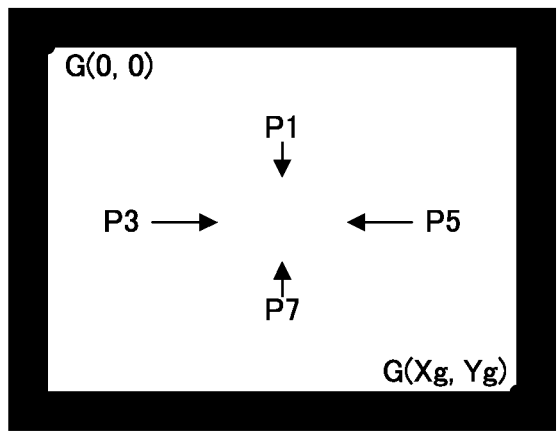
FIGS. 37A and 37B are diagrams illustrating examples of display in Embodiment 4.
Figure 37B:
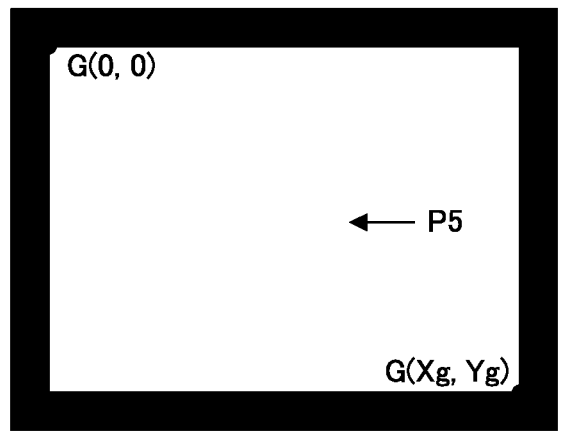

Here, FIGS. 37A and 37B are diagrams illustrating examples of display in Embodiment 4. FIG. 37A illustrates an example of display in a case where the positions of four fixed-point cameras are displayed to be superimposed on a screen so that the degree of similarity between the students A to D is maximized.

FIG. 37B illustrates an example of display in a case where the position of one fixed-point camera is displayed to be superimposed on the screen so that a score is set to a maximum value when the number of fixed-point cameras is set to one in step S3202. Note that known methods such as AR VR, and MR are adopted as a method of realizing a specific example of display. In addition, the example of display in the present Embodiment is an example, and a user may be notified of installation information of the camera, or display using an icon, or the like may be performed.

As described above, in the image processing device according to the present Embodiment, the number, positions, and directions of fixed-point cameras can be obtained in a shorter period of time than in the related art, and thus it is possible to efficiently perform location hunting work for event imaging.

Note that a camera to be used for the actual imaging may be a general still camera, a video camera, or a remote camera such as a drone in addition to a fixed-point camera.

Embodiment 5

Next, Embodiment 5 of the present invention will be described.

In Embodiment 5, in a case where a fixed-point camera having a subject following function is installed, setting information for determining the installation position and direction of at least one camera is provided so that a model to be imaged is included in a desired captured image.

Regarding processing for displaying information regarding the installation positions and directions of fixed-point cameras in the present Embodiment, processing in a case where four students A to D dance at a sports day will be described as an example with reference to FIGS. 38 to 41.

Figure 38:
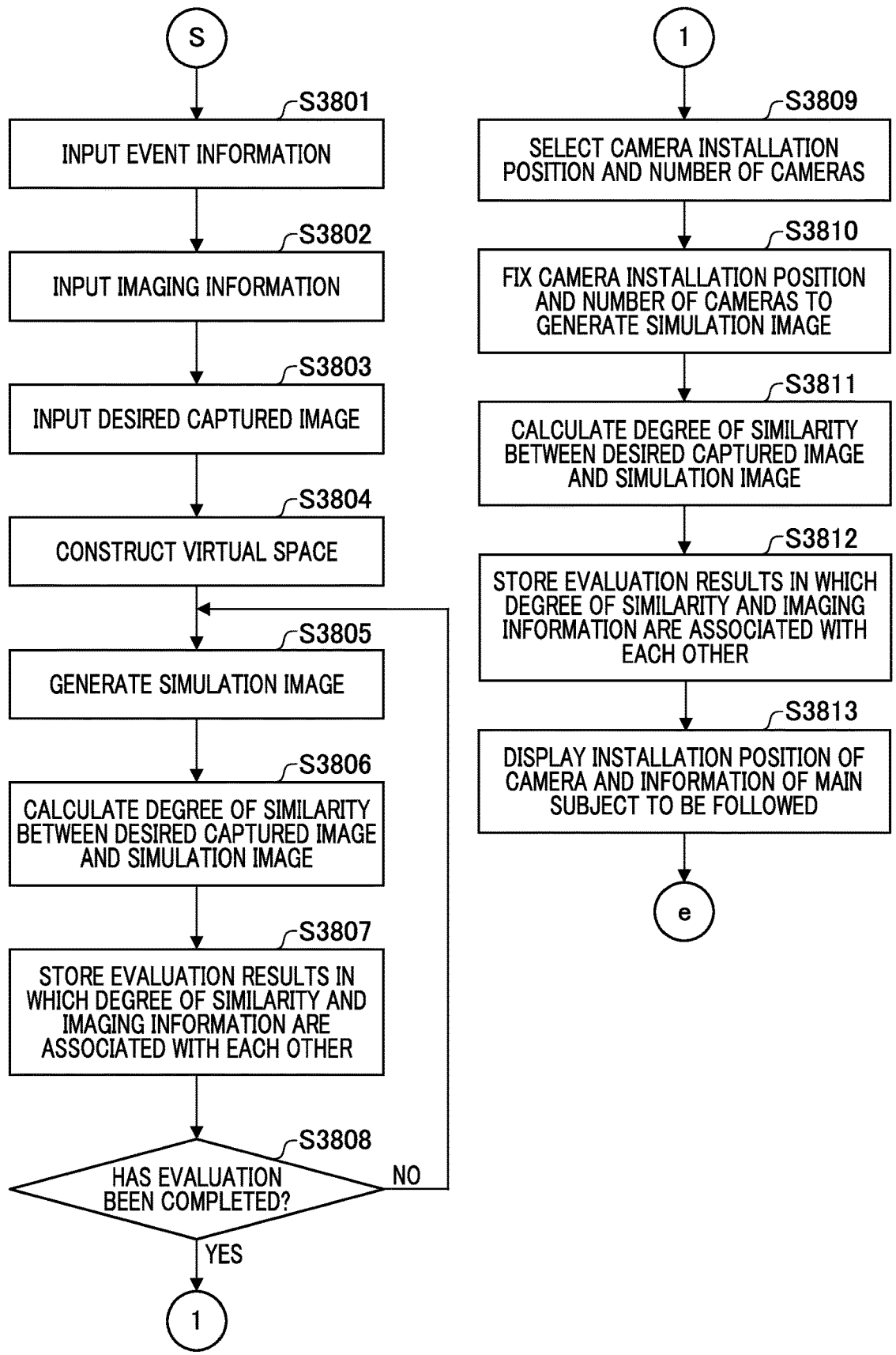
FIG. 38 is a flowchart regarding processing for displaying information on an installation position and direction of a fixed-point camera in Embodiment 5.

FIG. 38 illustrates a flowchart related to processing for displaying information regarding the installation positions and directions of the fixed-point cameras in the present Embodiment.

Steps S3801 to S3808 in FIG. 38 are the same as steps S3201 to S3208 of FIG. 32 in Embodiment 4, and thus S3809 and the subsequent steps which are differences from Embodiment 4 will be described.

In step S3809, a camera installation information selection unit 106 sorts evaluation results stored in the evaluation result storage unit 3104, for example, in descending order of a score and selects the positions, directions, and number of fixed-point cameras, and the processing proceeds to step S3810.

Figure 39:
FIG. 39 is a diagram illustrating an example of selection of the position of a fixed-point camera in Embodiment 5.

Here, FIG. 39 is a diagram illustrating an example of selection of the positions of the fixed-point cameras in Embodiment 5, and illustrates an example of selection of the camera installation information selection unit 106. FIG. 39 illustrates an example of selection in a case where one fixed-point camera is disposed at a position (P5) so that the degree of similarity of the students A to D is maximized and illustrates an example of display similar to FIG. 37B.

In step S3810, a plurality of simulation images are generated under conditions that the desired captured image input in step S3802, the virtual space constructed in step S3804, and the positions and number of the fixed-point cameras selected in step S3809 are fixed, and the imaging directions D0 to D15 of the cameras are made variable, and the processing proceeds to step S3811.

In step S3811, the evaluation unit 103 calculates the degree of similarity for each of the students A to D for each condition based on the simulation images generated in step S3810, and the processing proceeds to step S3812.

In step S3812, the degree of similarity for each of the students A to D calculated in step S3811 and the imaging information of the fixed-point cameras used at the time of generating the simulation images are stored as evaluation results associated with each other by the evaluation result storage unit 3104, and the processing proceeds to step S3813.

In step S3813, the degree of similarity calculated from the evaluation results held in the evaluation result storage unit 3104 is evaluated, information for selecting students A to D to be followed is displayed on the display device for each camera in chronological order, and processing ends.

Next, a specific example of processing of step S3813 will be described with reference to FIGS. 40 and 41.

Figure 40A:
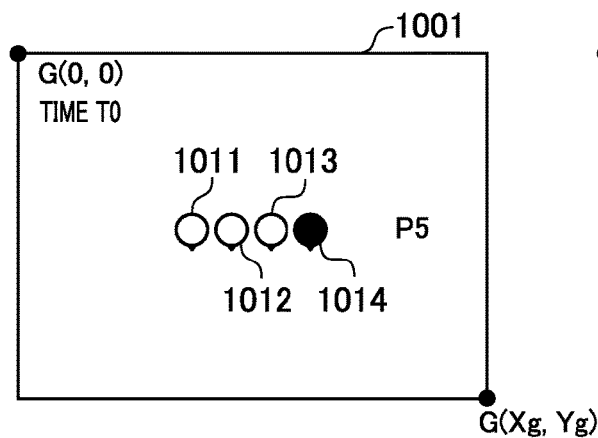
FIGS. 40A to 40C are diagrams illustrating examples of selection of the positions and number of fixed-point cameras in Embodiment 5.
Figure 40B:
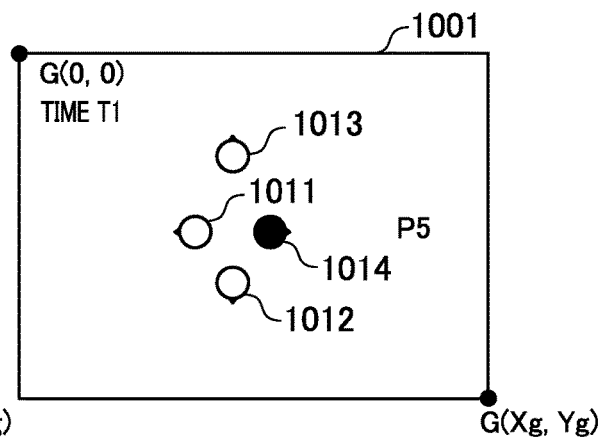
Figure 40C:
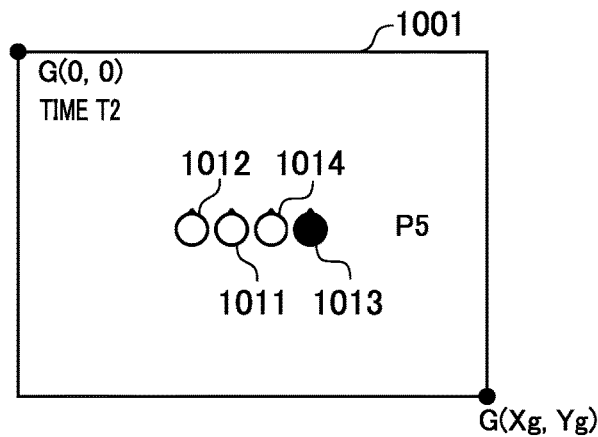

FIGS. 40A to 40C are diagrams illustrating examples of selection of the positions and number of fixed-point cameras in Embodiment 5, and illustrates a student having a maximum score for each time in a case where the position of one fixed-point camera is disposed at P5 so that the degree of similarity between the students A to D is maximized.

FIG. 40A illustrates that a maximum score of the camera disposed at the position P5 at time T0 is a student D1014. FIG. 40B illustrates that a maximum score of the camera disposed at the position P5 at time T1 is the student D1014. FIG. 40C illustrates that a maximum score of a camera disposed at the position P5 at time T2 is a student C1013. Thus, a main subject followed by the camera disposed at the position P5 is the student D1014 at times T0 and T1 for each time-series, and the student C1013 is selected at T2.

FIG. 41 is a conceptual diagram illustrating the fixed-point camera and the subject to be followed in Embodiment 5, and illustrates an example of display on a display device. In the present Embodiment, a table in which time and followed main subject information are associated with a camera installed at the position P5 so that a selected main subject is switched between time T1 and time T2 is displayed.

Note that known methods such as AR, VR, and MR are adopted for specific display. In addition, the example of display in the present Embodiment is an example, and a user may be notified of installation information of the camera and main subject information for following, or display using an icon may be performed.

Note that, in the present Embodiment, one camera performs sorting so that the degree of similarity to a desired captured image is maximized, but sorting may be similarly performed so that the degree of similarity to a desired captured image is maximized even when for example, four cameras are installed.

Further, in a case where a plurality of cameras are installed and two or more cameras select the same main subject at the same time, selection of a main subject with the highest degree of similarity may be validated, and the other cameras may perform sorting so that the degree of similarity of a different main subject is maximized.

As described above, in the image processing device according to the present Embodiment, it is possible to efficiently perform location hunting for event imaging by obtaining the number, positions, and directions of fixed-point cameras in a shorter period of time than in the related art.

Note that a camera to be used for the actual imaging may be a general still camera, a video camera, or a remote camera such as a drone in addition to a fixed-point camera.

Although the present invention has been described above in detail based on the preferred Embodiments, the present invention is not limited to the above-described Embodiments, and various modifications can be made based on the gist of the present invention and are not excluded from the scope of the invention.

Note that some or all of the controls in the present Embodiment may be supplied to a simulation device or the like via a network or various storage mediums for implementing the functions of the above-described Embodiments. In addition, a computer (or a CPU, an MPU, or the like) in the simulation device or the like may read and execute the program. In that case, the program and a storage medium storing the program constitute the present invention.

CROSS REFERENCE TO RELATED APPLICATION

This application claims the benefit of previously filed Japanese Patent Application No. 2020-121819, filed on Jul. 16, 2020. In addition, the content of each of these Japanese Patent Applications is hereby incorporated by reference in its entirety.

What is claimed is:

1. An image processing device comprising:
at least one memory for storing commands; and
at least one processor for executing the commands by communicating with the at least one memory,
wherein the commands include
inputting information on an event to be imaged and imaging information,
constructing a virtual space assuming an event situation based on the information on the event to be imaged,
generating a simulation image based on the imaging information using the virtual space,
evaluating a degree of similarity between the simulation image and a desired captured image, and giving a notification of imaging conditions according to the evaluated degree of similarity.

2. A simulation device comprising:
at least one memory for storing commands; and
at least one processor for executing the commands stored in the at least one memory to function as:
an information input unit configured to input information on an event to be imaged and imaging information;
a virtual space construction unit configured to construct a virtual space assuming an event situation using a subject model based on the information on the event to be imaged input by the information input unit;
a simulation image generation unit configured to generate an image, which is obtained when imaging is performed at an event venue, as a simulation image by using the virtual space;
an evaluation unit configured to evaluate a degree of similarity between the simulation image and a desired captured image; and
a notification unit configured to give a notification of imaging conditions according to the degree of similarity evaluated by the evaluation unit.

3. The simulation device according to claim 2, wherein the information on the event includes at least one of program information including content of the event and the order of the event, and information on accessible regions.

4. The simulation device according to claim 3, wherein the program information includes subject positional information regarding at least one of a layout of the event venue, the position of the subject at each time, and the direction of the subject.

5. The simulation device according to claim 4, wherein the subject positional information is selected from among preset samples.

6. The simulation device according to claim 2, wherein the imaging information includes at least one of an imaging position, an imaging direction, and an imaging angle-of-view.

7. The simulation device according to claim 2, wherein the desired captured image includes at least one of the number of subjects, positions of the faces, sizes of the faces, and directions of the faces.

8. The simulation device according to claim 2, wherein the desired captured image is selected from among preset samples.

9. The simulation device according to claim 2, wherein the evaluation unit calculates the degree of similarity for each of at least two of the numbers of subjects, positions of faces, sizes of the faces, and directions of the faces in the simulation image and the desired captured image, and calculates an evaluation value using a weighting factor which is set in accordance with the desired captured image.

10. The simulation device according to claim 2, wherein the notification unit notifies a user of a predetermined simulation image and predetermined imaging conditions in accordance with the degree of similarity.

11. The simulation device according to claim 2, wherein the notification unit gives a notification of a moving route for sequentially performing imaging under predetermined imaging conditions according to the degree of similarity.

12. The simulation device according to claim 11, wherein the notification unit displays the moving route superimposed on a live-view image.

13. The simulation device according to claim 11, wherein the imaging information includes a speed at which movement is possible,
the notification unit calculates a plurality of the moving routes based on the speed at which movement is possible, and
a UI for the user to select one of the plurality of moving routes is included.

14. The simulation device according to claim 11, wherein the information on the event includes positional information of event viewers,
the evaluation unit includes an interference evaluation value for the event viewers, and
the notification unit calculates the moving route based on the interference evaluation value.

15. The simulation device according to claim 2, wherein the notification unit displays the moving route and a model of a subject on a virtual space on a monitor superimposed on a live-view image before the event.

16. The simulation device according to claim 2, wherein the notification unit gives a notification of information on the position and direction of a camera for including a predetermined subject model in the desired captured image based on the degree of similarity.

17. The simulation device according to claim 2, wherein the information input unit inputs main subject information including the degree of priority of a main subject, and
the notification unit gives a notification of information regarding the position and direction of the camera based on the degree of priority.

18. The simulation device according to claim 2, wherein the notification unit gives a notification of information on the position of the camera based on the degree of similarity and the number of cameras or lens information.

19. A non-transitory computer-readable storage medium configured to store a computer program comprising instructions for executing following processes:
inputting information on an event to be imaged and imaging information,
constructing a virtual space assuming an event situation based on the information on the event to be imaged,
generating a simulation image based on the imaging information using the virtual space,
evaluating a degree of similarity between the simulation image and a desired captured image, and
giving a notification of imaging conditions according to the evaluated degree of similarity.

* * * * *